United States Patent
Yoo et al.

(10) Patent No.: US 11,762,558 B2
(45) Date of Patent: Sep. 19, 2023

(54) STORAGE DEVICE HAVING A CONTROLLER THAT COMMUNICATES WITH EACH OF TWO MEMORIES THROUGH SEPARATE INTERFACES

(71) Applicant: SAMSUNG ELECTRONICS CO., LTD., Suwon-si (KR)

(72) Inventors: Younggeon Yoo, Seoul (KR); Changkyu Seol, Osan-si (KR); Hyeonwu Kim, Gyeongsangbuk-Do (KR); Hyeongseok Song, Ansan-si (KR)

(73) Assignee: Samsung Electronics Co., Ltd.

( * ) Notice: Subject to any disclaimer, the term of this patent is extended or adjusted under 35 U.S.C. 154(b) by 279 days.

(21) Appl. No.: 16/533,883

(22) Filed: Aug. 7, 2019

(65) Prior Publication Data
US 2020/0097171 A1    Mar. 26, 2020

(30) Foreign Application Priority Data

Sep. 21, 2018  (KR) .......... 10-2018-0114090
Jan. 8, 2019   (KR) .......... 10-2019-0002343

(51) Int. Cl.
    *G06F 3/06*    (2006.01)

(52) U.S. Cl.
    CPC ............ *G06F 3/061* (2013.01); *G06F 3/0614* (2013.01); *G06F 3/0629* (2013.01); *G06F 3/0688* (2013.01)

(58) Field of Classification Search
    CPC ...... G06F 3/0614; G06F 3/0688; G06F 3/061; G06F 3/0629
    USPC .... 711/103, 12.008, 12.001, 12.002, 12.007, 711/100
    See application file for complete search history.

(56) References Cited

U.S. PATENT DOCUMENTS

| | | | |
|---|---|---|---|
| 9,021,182 B2 | 4/2015 | Park et al. | |
| 9,256,371 B2 | 2/2016 | Franceschini et al. | |
| 9,594,524 B2 | 3/2017 | Lam | |
| 9,634,774 B1* | 4/2017 | Mohammad Sayem | H04B 15/02 |
| 2008/0177942 A1 | 7/2008 | Dreps et al. | |
| 2014/0281161 A1* | 9/2014 | Chen | G06F 3/0611 711/103 |
| 2015/0039933 A1* | 2/2015 | Chen | G06F 3/0673 711/148 |
| 2015/0106547 A1 | 4/2015 | King | |
| 2016/0321002 A1 | 11/2016 | Jung et al. | |

(Continued)

FOREIGN PATENT DOCUMENTS

WO    WO2013028849 A1    2/2013

OTHER PUBLICATIONS

Singaporean Examination Report dated Feb. 7, 2023 From the Singapore Patent Office Corresponding to Singapore Patent Application.

*Primary Examiner* — Sanjiv Shah
*Assistant Examiner* — Edward Waddy, Jr.
(74) *Attorney, Agent, or Firm* — Fish & Richardson P.C.

(57) ABSTRACT

A storage device includes a first memory device including a plurality of first memory cells, a second memory device including a plurality of second memory cells having the same type as the plurality of first memory cells, and a controller that communicates with the first memory device through a first memory interface and communicates with the second memory device through a second memory interface having an operating speed higher than an operating speed of the first memory interface.

6 Claims, 28 Drawing Sheets

(56) References Cited

U.S. PATENT DOCUMENTS

| | | | |
|---|---|---|---|
| 2016/0342363 A1* | 11/2016 | Krause | G06F 3/0683 |
| 2016/0370998 A1 | 12/2016 | Shung et al. | |
| 2017/0062066 A1 | 3/2017 | Narai et al. | |
| 2017/0154656 A1* | 6/2017 | Yeh | G06F 3/0679 |
| 2018/0102344 A1* | 4/2018 | Ramachandra | G11C 7/22 |
| 2018/0136843 A1* | 5/2018 | Lee | G11C 16/32 |
| 2018/0173677 A1* | 6/2018 | Muralimanohar | G06F 7/5443 |
| 2019/0034111 A1* | 1/2019 | Catthoor | G06N 3/0445 |
| 2020/0073581 A1* | 3/2020 | Croxford | G06F 3/0673 |

* cited by examiner

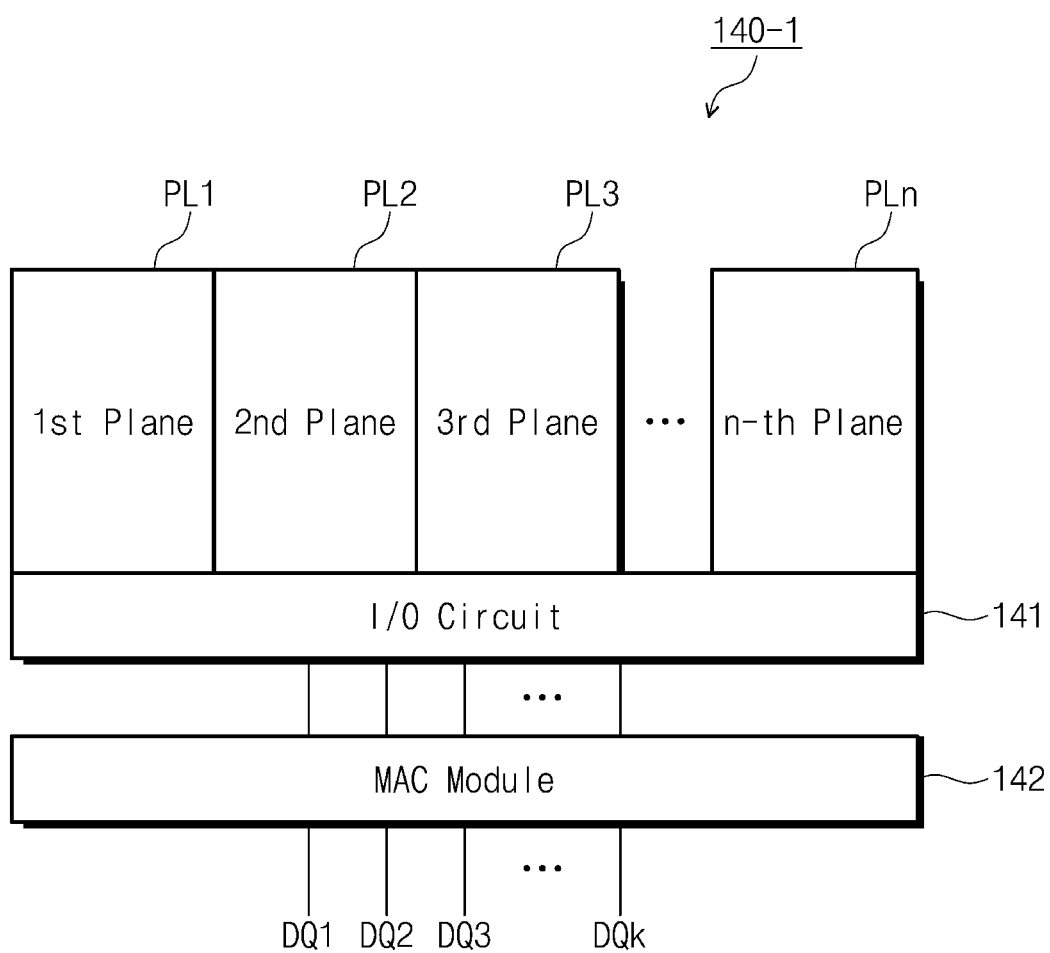

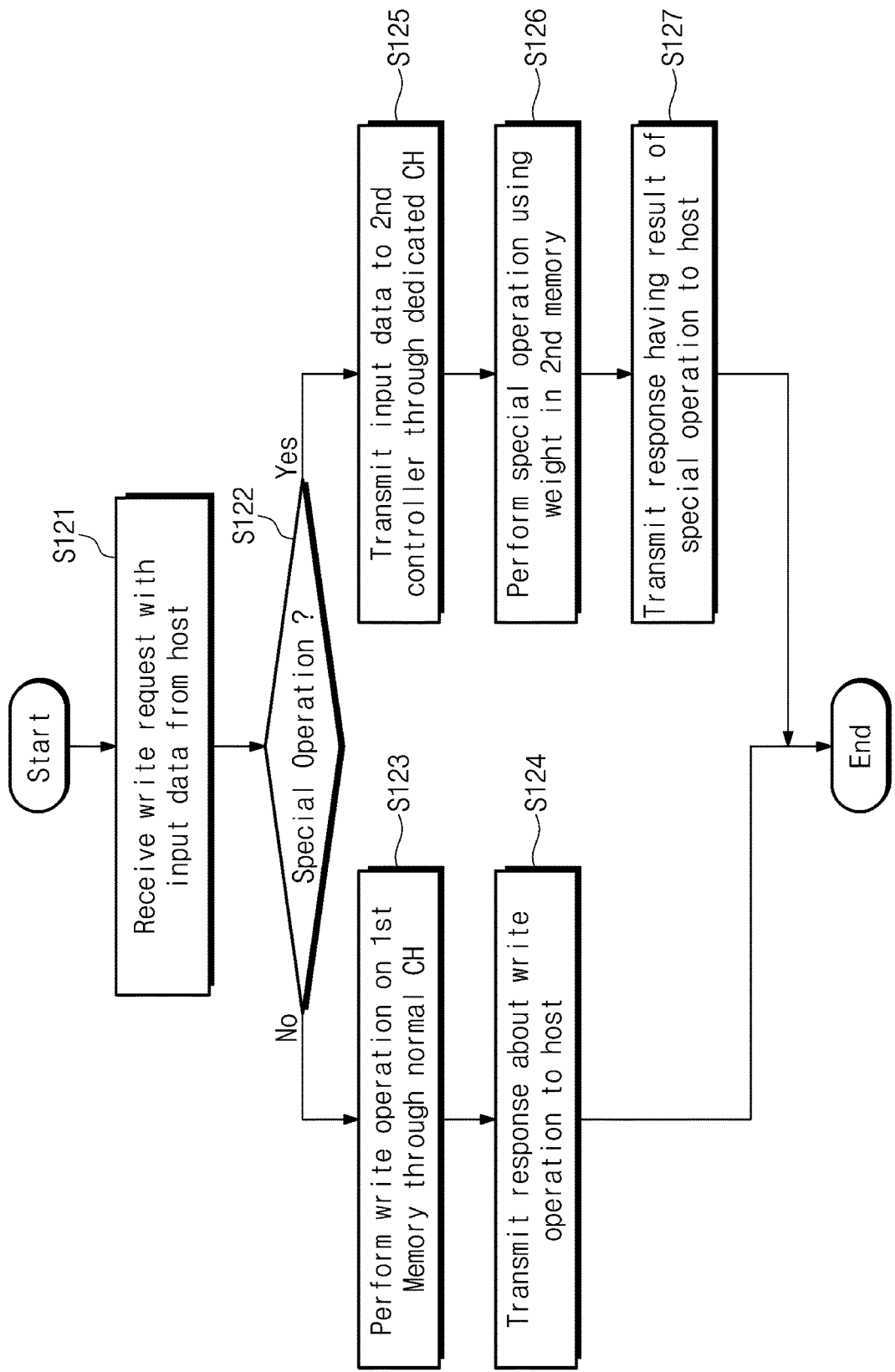

STORAGE DEVICE HAVING A CONTROLLER THAT COMMUNICATES WITH EACH OF TWO MEMORIES THROUGH SEPARATE INTERFACES

CROSS-REFERENCE TO RELATED APPLICATIONS

This application claims priority under 35 U.S.C. § 119 to Korean Patent Application Nos. 10-2018-0114090 filed on Sep. 21, 2018, and 10-2019-0002343 filed on Jan. 8, 2019, in the Korean Intellectual Property Office, the disclosures of which are incorporated by reference herein in their entireties.

BACKGROUND

Embodiments of the disclosure described herein relate to an electronic device, and more particularly, relate to a storage device.

Nowadays, an artificial intelligence (AI) function is being utilized in various fields. For example, in various electronic devices such as a personal computer, a notebook, a tablet, a smartphone, and a digital camera, the artificial intelligence function may be utilized for various functions such as voice recognition and image classification. In general, the artificial intelligence function accompanies a lot of calculations. To implement a lot of calculations, a calculation circuit of a faster operating speed and a high-capacity high-speed memory for processing data are required. According to the related art, the artificial intelligence function has been supported by using a separate data center or a separate server which includes a circuit supporting a high-speed calculation and a high-capacity high-speed memory.

However, the way to use the separate data center causes an increase in costs due to the use of the data center and a delay due to data transmission/reception over a network.

SUMMARY

Embodiments of the disclosure provide a storage device having an improved performance and reduced costs.

According to an example embodiment, a storage device includes a first memory device including a plurality of first memory cells, a second memory device including a plurality of second memory cells having the same type as the plurality of first memory cells, and a controller that communicates with the first memory device through a first memory interface and communicates with the second memory device through a second memory interface having an operating speed higher than an operating speed of the first memory interface.

According to an example embodiment, a storage device includes a first controller that communicates with an external device through a host interface, a first memory device that includes a plurality of first memory cells and communicates with the first controller through a first channel of a first memory interface, a second memory device that includes a plurality of second memory cells having the same type as the plurality of first memory cells, and a second controller that communicates with the first controller through a second channel of the first memory interface and is connected with the second memory device through a second memory interface.

According to an example embodiment, a storage device includes a first memory device including a plurality of first NAND flash memory cells, a second memory device including a plurality of second NAND flash memory cells, and a controller that communicates with the first memory device through a first memory interface and communicates with the second memory device through a second memory interface having a larger input/output bandwidth than the first memory interface.

According to an example embodiment, a storage device includes a first nonvolatile memory, a second nonvolatile memory, a first controller, and a second controller. The first controller accesses a first memory location within the first nonvolatile memory by communicating a first memory-access command to the first nonvolatile memory. The second controller uses weight information stored in the second nonvolatile memory to execute an operation on first data communicated by the first controller.

BRIEF DESCRIPTION OF THE FIGURES

The above and other objects and features of the disclosure will become apparent by describing in detail example embodiments thereof with reference to the accompanying drawings.

FIGS. 5A to 5D are block diagrams illustrating a first memory device and a second memory device of FIG. 1.

FIG. 10 is a flowchart illustrating an operation of a storage device of FIG. 1.

DETAILED DESCRIPTION

Below, embodiments of the disclosure may be described in detail and clearly to such an extent that an ordinary one in the art easily implements the disclosure.

The terms "unit", "module", etc. to be used in the specification or function blocks illustrated in drawings may be implemented in the form of software, hardware, or a combination thereof.

Figure 1:
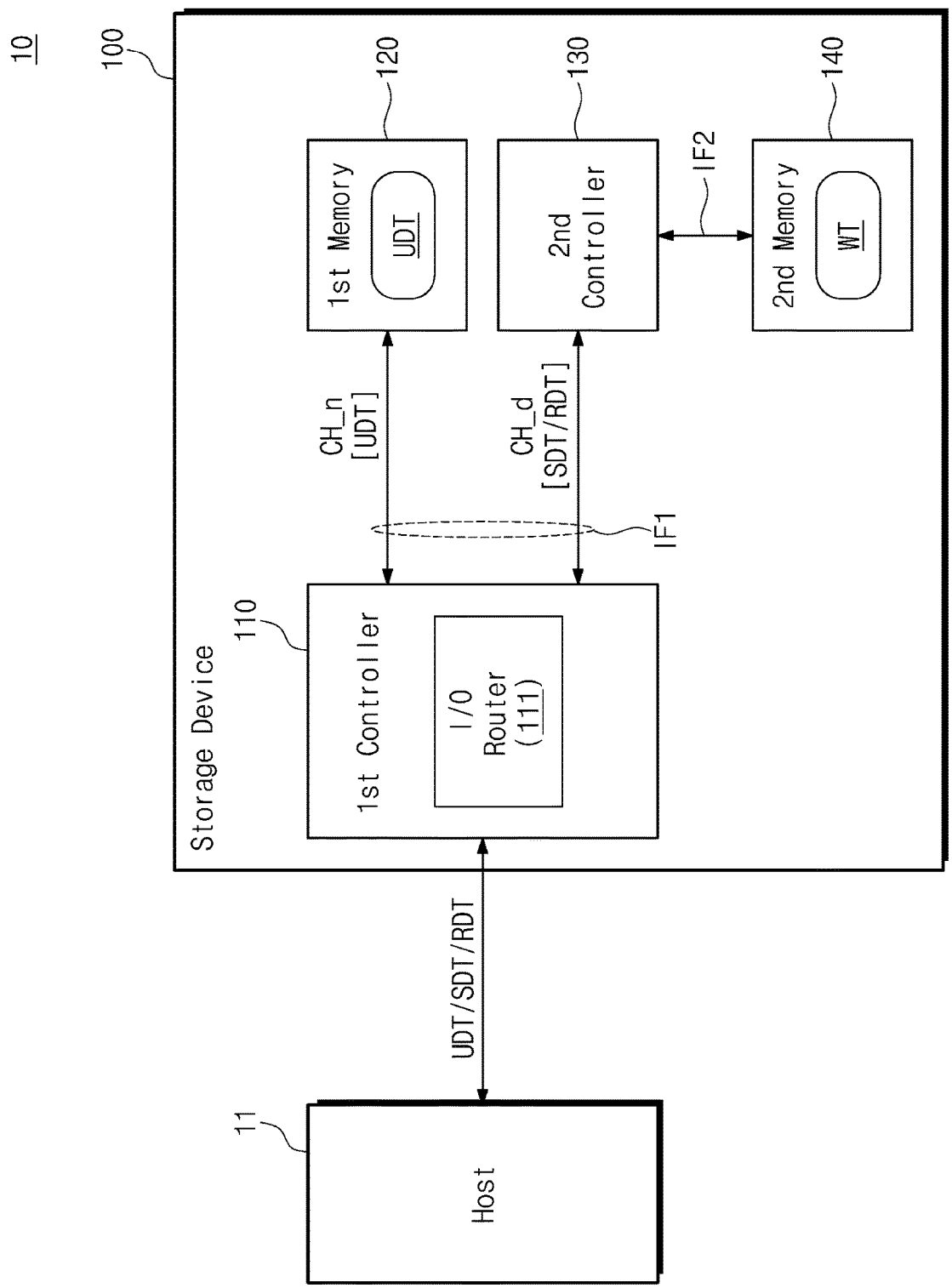
FIG. 1 is a block diagram illustrating a computing system according to an embodiment of the disclosure.

FIG. 1 is a block diagram illustrating a computing system according to an embodiment of the disclosure. Referring to FIG. 1, a computing system 10 may include a host 11 and a storage device 100. In an example embodiment, the computing system 10 may be one of computing devices, which perform various calculation functions, such as a personal computer (PC), a tablet PC, a digital camera, and a smartphone.

The host 11 may perform various operations necessary for the computing system 10 to operate. In an example embodiment, the host 11 may be a central processing unit (CPU) or an application processor (AP) which performs overall operations of the computing system 10. The host 11 may communicate with the storage device 100 through a host interface. The host 11 may store data in the storage device 100 or may read data stored in the storage device 100.

In an example embodiment, the host 11 may provide data (hereinafter referred to as "special data SDT") for performing a machine learning (ML) function to the storage device 100. For example, as described above, the host 11 may be configured to perform overall operations of the computing system 10. While the host 11 operates, a special operation (e.g., voice recognition, image classification, image recognition) associated with specific data SDT may be required. In this case, the host 11 may provide the special data SDT to the storage device 100.

In an example embodiment, the special data SDT may not be stored in the storage device 100 in a nonvolatile form. The special data SDT may include voice data, image data, or a specific type of data, based on a kind of a special operation to be performed by a second controller 130.

The storage device 100 may selectively perform any one of a normal operation and the special operation (e.g., a machine learning operation) under control of the host 11. In an example embodiment, the normal operation may indicate an operation of storing user data UDT in a first memory 120 or reading the user data UDT stored in the first memory 120, under control of the host 11. Alternatively, the normal operation may indicate various operations performed by a typical storage device, such as a read operation, a write operation, an erase operation, a physical erase operation, a device reset operation, and an initialization operation. That is, the normal operation may indicate an operation which is performed by the typical storage device under control of the host 11. The special operation may indicate an artificial intelligence operation or a machine learning operation, which is based on an artificial intelligence function (e.g., a convolutional neural network or a deep neural network), such as voice recognition image classification, and image identification.

In other words, in the case where the storage device 100 performs the normal operation under control of the host 11, the storage device 100 may store the user data UDT received from the host 11, may transmit the stored user data UDT to the host 11, or may perform any other normal operations (e.g., a device reset operation, an initialization operation, a power-down operation, and a power-up operation). In the case where the storage device 100 performs the special operation under control of the host 11, the storage device 100 may receive the special data SDT from the host 11, may perform a special operation on the special data SDT, and may transmit result data RDT including a result of the special operation to the host 11.

The storage device 100 may include a first controller 110, the first memory device 120, the second controller 130, and a second memory device 140. The first controller 110 may control overall operations of the storage device 100. The first controller 110 may include an input/output (I/O) router 111. The input/output router 111 may determine whether a request received from the host 11 is associated with the normal operation or is associated with the special operation, and may provide information (e.g., the user data UDT or the special data SDT) received from the host 11 to the first memory 120 or the second controller 130 based on a result of the determination.

For example, in the case where a request associated with the normal operation is received from the host 11, the input/output router 111 may determine input data received together with the request as the user data UDT, and may transmit the received user data UDT to the first memory device 120 through a normal channel CH_n. In the case where a request associated with the special operation is received from the host 11, the input/output router 111 may determine input data received together with the request as the special data SDT, and may transmit the received special data SDT to the second controller 130 through a dedicated channel CH_d. In an example embodiment, the input/output router 111 may be configured to transmit the special data SDT to the first memory device 120, and the first memory device 120 may be configured to store the special data SDT.

In an example embodiment, a first memory interface IF1 may include a plurality of channels, and any one of the plurality of channels may be the normal channel CH_n, and any other channel thereof may be the dedicated channel CH_d. In an example embodiment, the plurality of channels included in the first memory interface IF1 may indicate communication paths which are driven independently of each other, and the plurality of channels may communicate with devices which are respectively connected to the channels based on the same communication manner.

In an example embodiment, based on various information (e.g., address information, logical unit information, and command information) from the host 11, the input/output router 111 may determine whether a request received from the host 11 is associated with the normal operation or is associated with the special operation, or may determine whether input data received from the host 11 are the user data UDT or are the specific data SDT.

The first memory device 120 may perform the normal operation under control of the first controller 110 through the normal channel CH_n. For example, the first memory device 120 may receive the user data UDT from the first controller 110 through the normal channel CH_n and may store or program the received user data UDT.

The second controller 130 may perform the special operation under control of the first controller 110 through the dedicated channel CH_d. For example, the second controller 130 may be configured to support a machine learning function such as voice recognition, image classification, or image identification. The second controller 130 may receive the special data SDT from the first controller 110 through the dedicated channel CH_d and may perform a special operation on the received special data SDT. The second controller 130 may provide the result data RDT including a result of the special operation to the first controller 110 through the dedicated channel CH_d under control of the first controller 110.

In an example embodiment, the second controller 130 may perform the above-described special operation by using a weight WT stored in the second memory device 140 through a second memory interface IF2. For example, the second controller 130 may require weight (WT) information for performing the supported special operation. In the case where the special operation is performed, the second controller 130 may perform the above-described special operation based on the weight WT stored in the second memory device 140. In an example embodiment, the second controller 130 may be an accelerator hardware for the machine learning functions.

In an example embodiment, the first and second memory devices 120 and 140 may be respectively implemented with memory devices of the same type. For example, the first and second memory devices 120 and 140 may include NAND flash memory cells or a charge trap flash (CTF) cells and may operate at different operating speeds.

In an example embodiment, each of the first and second memory devices 120 and 140 may be a NAND flash memory device, but the disclosure is not limited thereto. For example, each of the first and second memory devices 120 and 140 may be any one of nonvolatile memory devices such as a flash memory, a phase-change random access memory (PRAM), a magnetic RAM (MRAM), a resistive RAM (RRAM), etc. Alternatively, an operating speed of the second memory device 140 may be higher than an operating speed of the first memory device 120. In an example embodiment, the second memory device 140 may be a high-speed memory such as a dynamic random-access memory (DRAM).

In an example embodiment, each of the first controller 110, the first memory device 120, the second controller 130, and the second memory device 140 may be implemented with a separate semiconductor device, a separate semiconductor chip, a separate semiconductor die, or a separate semiconductor package. Alternatively, a part of the first controller 110, the first memory device 120, the second controller 130, and the second memory device 140 may be implemented with one semiconductor device, one semiconductor chip, one semiconductor die, or one semiconductor package. For example, the second controller 130 and the second memory device 140 may be implemented with one semiconductor package, and the second controller 130 and the second memory device 140 may be connected to each other through a high-speed signal line (e.g., a through silicon via (TSV)) within the semiconductor package.

In an example embodiment, the normal channel CH_n between the first controller 110 and the first memory device 120 and the dedicated channel CH_d between the first controller 110 and the second controller 130 may be channels included in the first memory interface IF1. That is, each of the first memory device 120 and the second controller 130 may communicate with the first controller 110 based on the same interface. In an example embodiment, the first memory interface IF1 may be a NAND interface, but the disclosure is not limited thereto.

In an example embodiment, the second controller 130 and the second memory device 140 may communicate based on the second memory interface IF2 different from the first memory interface IF1. The second memory interface IF2 may be an interface which supports a higher operating speed than the first memory interface IF1. For example, the amount of data which the second memory interface IF2 transmits per time may be greater than the amount of data which the first memory interface IF1 transmits per time. Alternatively, a bandwidth of the second memory interface IF2 may be wider than a bandwidth of the first memory interface IF1. That is, the second controller 130 may read the weight WT stored in the second memory device 140 at a high speed.

As described above, the storage device 100 according to an embodiment of the disclosure may support the machine learning function. As such, because the burden on an operation of the host 11 may decrease or a separate data center is not used, a storage device having an improved performance and reduced costs is provided.

Figure 2:
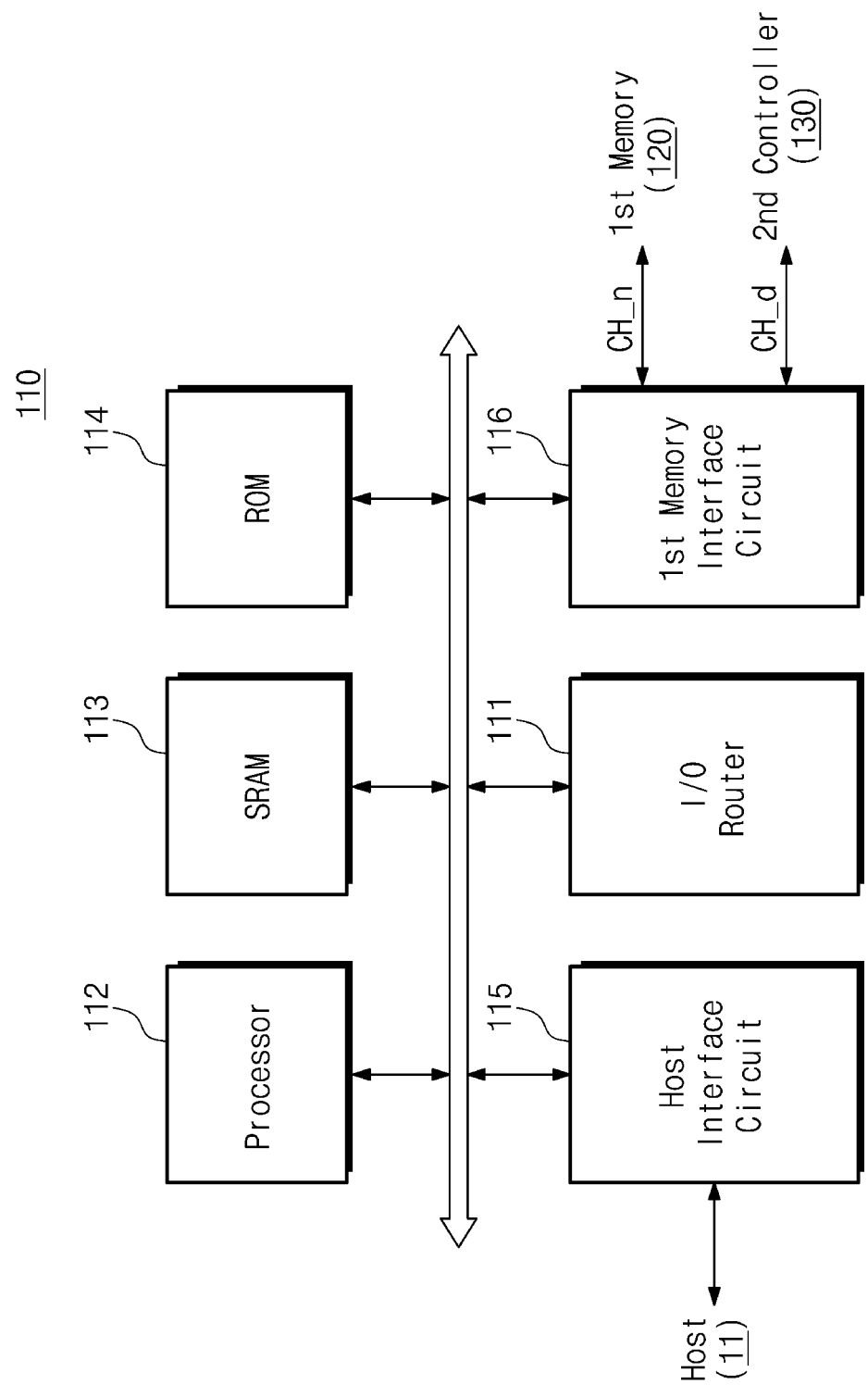
FIG. 2 is block diagram illustrating a first controller of FIG. 1.

FIG. 2 is a block diagram illustrating the first controller 110 of FIG. 1. Referring to FIG. 2, the first controller 110 may include the input/output router 111, a processor 112, an SRAM 113, a ROM 114, a host interface circuit 115, and a first memory interface circuit 116.

The input/output router 111 may determine whether a request (or data) provided from the host 11 is associated with the normal operation or is associated with the special operation. A determination operation of the input/output router 111 will be more fully described with reference to the following drawings.

The processor 112 may perform overall operations of the first controller 110. The SRAM 113 may be used as a working memory or a buffer memory of the first controller 110. The ROM 114 may store a variety of information, which is necessary for the first controller 110 to operate, in the form of firmware. In an example embodiment, the input/output router 111 may be implemented in the form of software, hardware, or a combination thereof. In the case where the input/output router 111 is implemented in the form of software, a program code or an instruction for performing an operation of the input/output router 111 may be stored in the SRAM 113 and may be executed by the processor 112. In an example embodiment, an operation of the input/output router 111 may be performed by a flash translation layer (FTL) (not illustrated).

The first controller 110 may communicate with the host 11 through the host interface circuit 115. In an example embodiment, the host interface circuit 115 may be based on at least one of various interfaces such as a double data rate (DDR) interface, a low-power DDR (LPDDR), a universal serial bus (USB) interface, a multimedia card (MMC) interface, a peripheral component interconnection (PCI) interface, a PCI-express (PCI-e) interface, an advanced technology attachment (ATA) interface, a serial-ATA (SATA) interface, a parallel-ATA (PATA) interface, a small computer small interface (SCSI) interface, an enhanced small disk interface (ESDI), an integrated drive electronics (IDE) interface, a mobile industry processor interface (MIPI), a nonvolatile memory-express (NVM-e) interface, and a universal flash storage (UFS) interface.

The first controller 110 may communicate with the first memory device 120 and the second controller 130 through the first memory interface circuit 116. In an example embodiment, the first memory interface circuit 116 may be based on a NAND interface. The first controller 110 may communicate with the first memory device 120 through the normal channel CH_n of the first memory interface circuit 116 and may communicate with the second controller 130 through the dedicated channel CH_d of the first memory interface circuit 116. The first memory interface circuit 116 may output data received from the host 11 through any one of the normal channel CH_n and the dedicated channel CH_d, based on a determination result of the input/output router 111.

In an example embodiment, the first controller 110 may use a program command in order to transmit the user data UDT to the first memory device 120 or transmit the special data SDT to the second controller 130. That is, the first controller 110 may transmit the program command and the user data UDT to the first memory device 120 through the normal channel CH_n. The first controller 110 may transmit the program command and the special data SDT to the second controller 130 through the dedicated channel CH_d.

Figure 3:
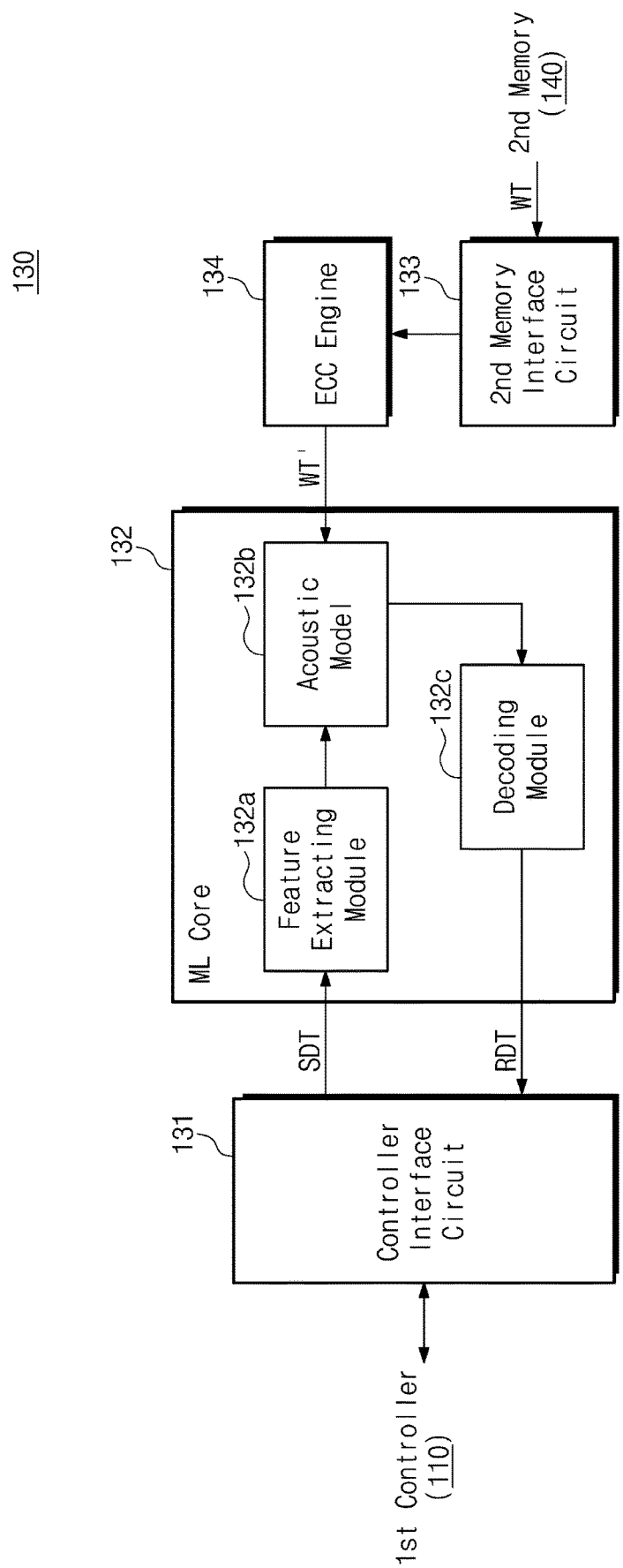
FIG. 3 is a block diagram illustrating a second controller of FIG. 1.

FIG. 3 is a block diagram illustrating a second controller of FIG. 1. Referring to FIGS. 1 and 3, the second controller 130 may include a controller interface circuit 131, a machine learning core 132, a second memory interface circuit 133, and an ECC engine 134.

The second controller 130 may communicate with the first controller 110 through the controller interface circuit 131. For example, the controller interface circuit 131 may communicate with the first memory interface circuit 116 of the first controller 110 through the dedicated channel CH_d. In an example embodiment, through the dedicated channel CH_d, the controller interface circuit 131 may receive the special data SDT from the first memory interface circuit 116 or may transmit the result data RDT to the first memory interface circuit 116.

The machine learning core 132 may perform the special operation on the special data SDT received from the controller interface circuit 131. In an example embodiment, the machine learning core 132 may perform the special operation on the special data SDT by using the weight WT stored in the second memory device 140.

For example, the second memory interface circuit 133 may read the weight WT from the second memory device 140 under control of the machine learning core 132. An error of the weight WT may be corrected by the ECC engine 134, and the error-corrected weight WT' may be provided to the machine learning core 132. The machine learning core 132 may perform the special operation on the special data SDT by using the error-corrected weight WT'.

Below, to describe a technical feature of the disclosure easily, it is assumed that the special operation to be performed by the machine learning core 132 is a voice recognition operation. That is, the special data SDT provided from the host 11 may be voice data, and the machine learning core 132 may perform the special operation (i.e., the voice recognition operation) on the special data SDT and may output the result data RDT. In this case, the result data RDT may be text data corresponding to the voice data.

The machine learning core 132 may include a feature extracting module 132a, an acoustic model 132b, and a decoding module 132c. The feature extracting module 132a may perform a feature extracting operation on the received special data SDT and may provide information of a frame unit to the acoustic model 132b. The acoustic model 132b may perform voice recognition on the information of the frame unit by using the error-corrected weight WT'. The decoding module 132c may receive a voice recognition result from the acoustic model 132b and may output the result data RDT (i.e., text data) corresponding to the received voice recognition result. In an example embodiment, the above-described operation of the machine learning core 132 may be based on an artificial intelligence algorithm such as a machine learning algorithm or a neural network algorithm. In an example embodiment, the machine learning core 132 may include at least one multiply accumulate (MAC) unit to perform the above-described special operation. That is, the machine learning core 132 may be configured to perform the above-described special operation by performing a MAC operation on the above-described weight WT and the information of the frame unit through the at least one MAC.

In an example embodiment, it is assumed that the frame unit is 10 ms and the weight WT used in the acoustic model 132b has a size of 100 MB. According to this assumption, for the machine learning core 132 to normally perform the special operation (i.e., the voice recognition operation), the weight WT of 100 MB may be provided to the acoustic model 132b every 10 ms. That is, the second controller 130 may read the weight WT of 100 MB from the second memory device 140 every 10 ms. To this end, the second memory interface circuit 133 may be implemented with a high-speed interface.

Figure 4:
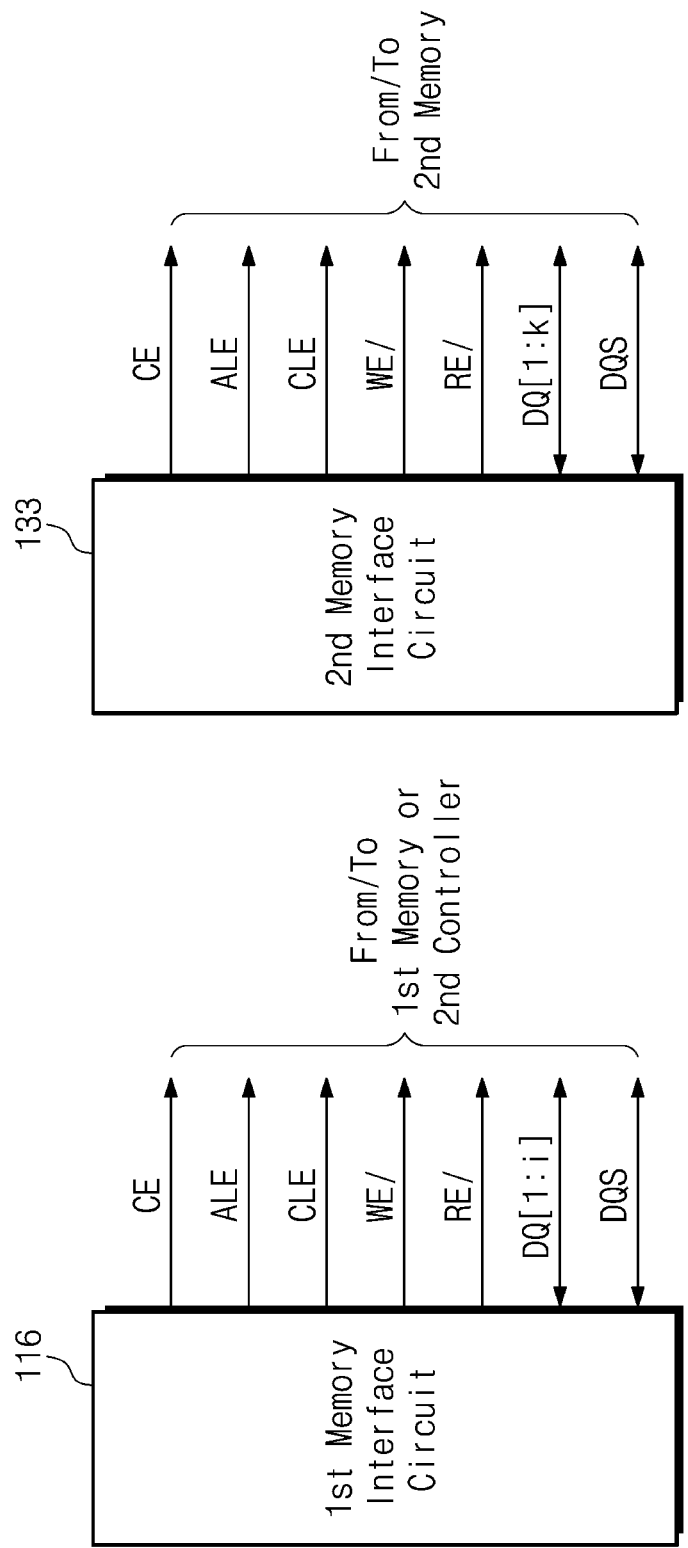
FIG. 4 is a diagram illustrating a first memory interface circuit of a first controller and a second memory interface circuit of a second controller.

For example, FIG. 4 is a diagram illustrating the first memory interface circuit 116 of the first controller 110 and the second memory interface circuit 133 of the second controller 130. As illustrated in FIG. 4, the first memory interface circuit 116 may be implemented with a typical NAND interface, but the disclosure is not limited thereto.

For example, the first memory interface circuit 116 may provide a chip enable signal CE, an address latch enable signal ALE, a command latch enable signal CLE, a write enable signal WE/, and a read enable signal RE/ to the first memory device 120 or the second controller 130, and may exchange data signals DQ[1:i] ("i" being an integer greater than 1) and a data strobe signal DQS with the first memory device 120 or the second controller 130. In an example embodiment, in FIG. 4, signals associated with the first memory interface circuit 116 may be a signal configuration corresponding to one channel (e.g., any one of the normal channel CH_n and the dedicated channel CH_d). The first memory device 120 or the second controller 130 may receive the user data UDT or the special data SDT from the first controller 110 through the signal configuration illustrated in FIG. 4.

The second memory interface circuit 133 may transmit the chip enable signal CE, the address latch enable signal ALE, the command latch enable signal CLE, the write enable signal WE/, and the read enable signal RE/ to the second memory device 140, and may exchange data signals DQ[1:k] ("k" being an integer greater than "1") and the data strobe signal DQS with the second memory device 140. In this case, the number of data signals DQ[1:k] of the second memory interface circuit 133 may be more than the number of data signals DQ[1:i] of the first memory interface circuit 116. In other words, a data input/output bandwidth of the second memory interface circuit 133 may be greater than a data input/output bandwidth of the first memory interface circuit 116. Accordingly, an operating speed of the second memory interface circuit 133 may be higher than an operating speed of the first memory interface circuit 116. As such, the second controller 130 may read the weight WT from the second memory device 140 at a high speed.

The configurations of the first and second memory interface circuits 116 and 133 described with reference to FIG. 4 is exemplary, and the disclosure is not limited thereto. The first and second memory interface circuits 116 and 133 may be implemented differently from the signal configuration illustrated in FIG. 4.

FIGS. 5A to 5D are block diagrams illustrating a first memory device and a second memory device of FIG. 1. FIG. 6 is a circuit diagram illustrating a memory block included in first and second memory devices of FIGS. 5A to 5D.

Figure 5A:
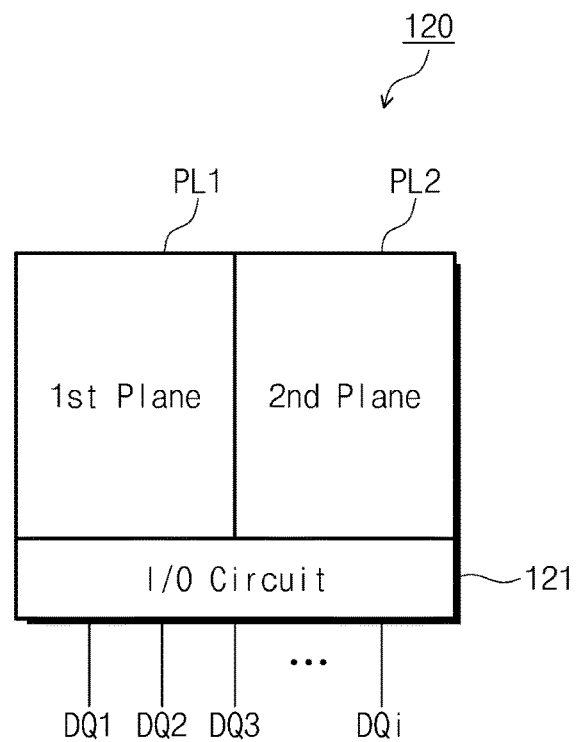
Figure 6:
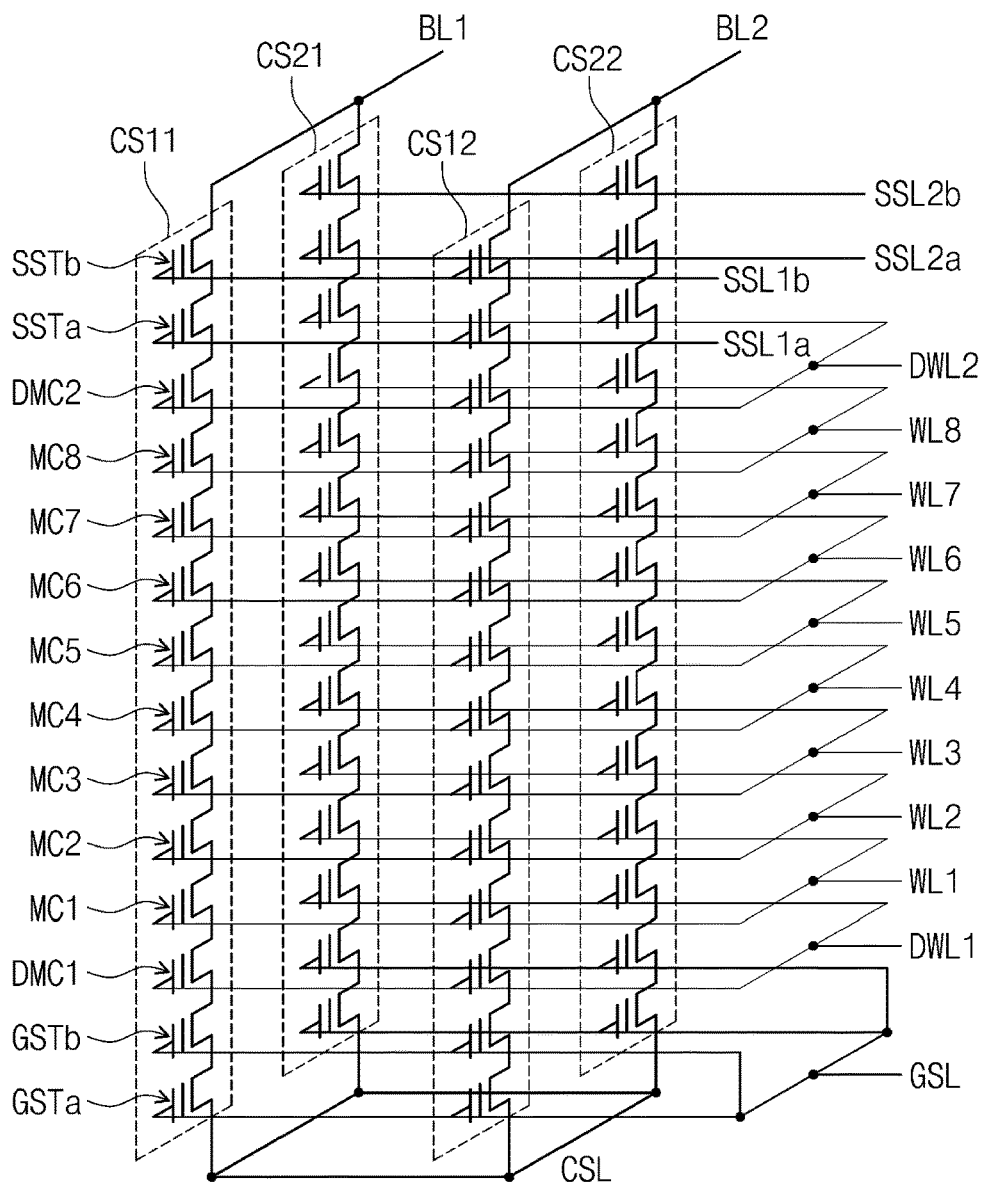
FIG. 6 is a circuit diagram illustrating a memory block included in first and second memory devices of FIGS. 5A to 5D.

Referring to FIGS. 1, 4, and 5A, the first memory device 120 may include first and second planes PL1 and PL2 and an input/output circuit 121. Each of the first and second planes PL1 and PL2 may include a plurality of memory blocks. The input/output circuit 121 may be connected with the first and second planes PL1 and PL2 and may exchange data with an external device (e.g., the first controller 110) through a plurality of data lines DQ1 to DQi ("i" being an integer greater than 1). For example, the input/output circuit 121 may include a plurality of data signal pins respectively connected with the plurality of data lines DQ1 to DQi.

Figure 5B:
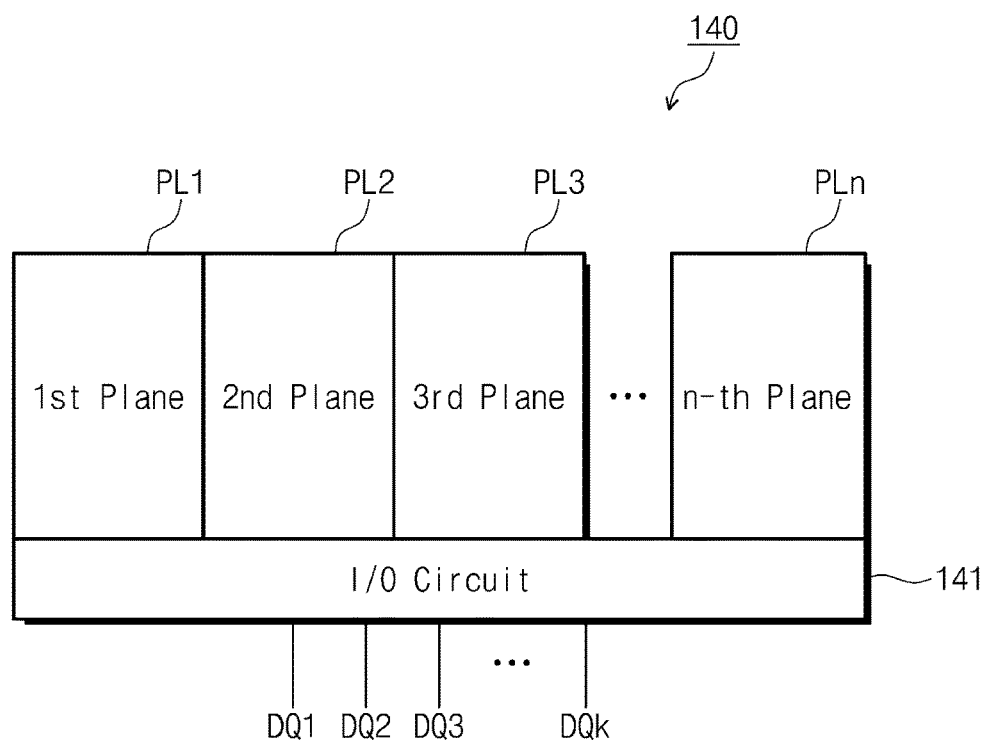

Referring to FIGS. 1, 4, and 5B, the second memory device 140 may include a plurality of planes PL1 to PLn ("n" being an integer greater than 1) and an input/output circuit 141. Each of the plurality of planes PL1 to PLn may include a plurality of memory blocks. The input/output circuit 141 of the second memory device 140 may be connected with the plurality of planes PL1 to PLn and may exchange data with an external device (e.g., the second controller 130) through a plurality of data lines DQ1 to DQk ("k" being an integer greater than "i"). For example, the input/output circuit 141 may include a plurality of data signal pins respectively connected with the plurality of data lines DQ1 to DQk.

As illustrated in FIGS. 5A and 5B, the number of planes included in the second memory device 140 may be more than the number of planes included in the first memory device 120. In an example embodiment, a plane may mean a set of memory blocks sharing the same bit lines. That is, memory blocks included in one plane may share the same bit lines.

In an example embodiment, the number of data signal pins (i.e., the number of DQ pins) of the second memory device 140 may be more than the number of data signal pins (i.e., the number of DQ pins) of the first memory device 120. Alternatively, the number of data lines of the second memory device 140 may be more than the number of data lines of the first memory device 120. That is, the second memory device 140 may exchange data with the external device at a higher speed than the first memory device 120.

Figure 5C:
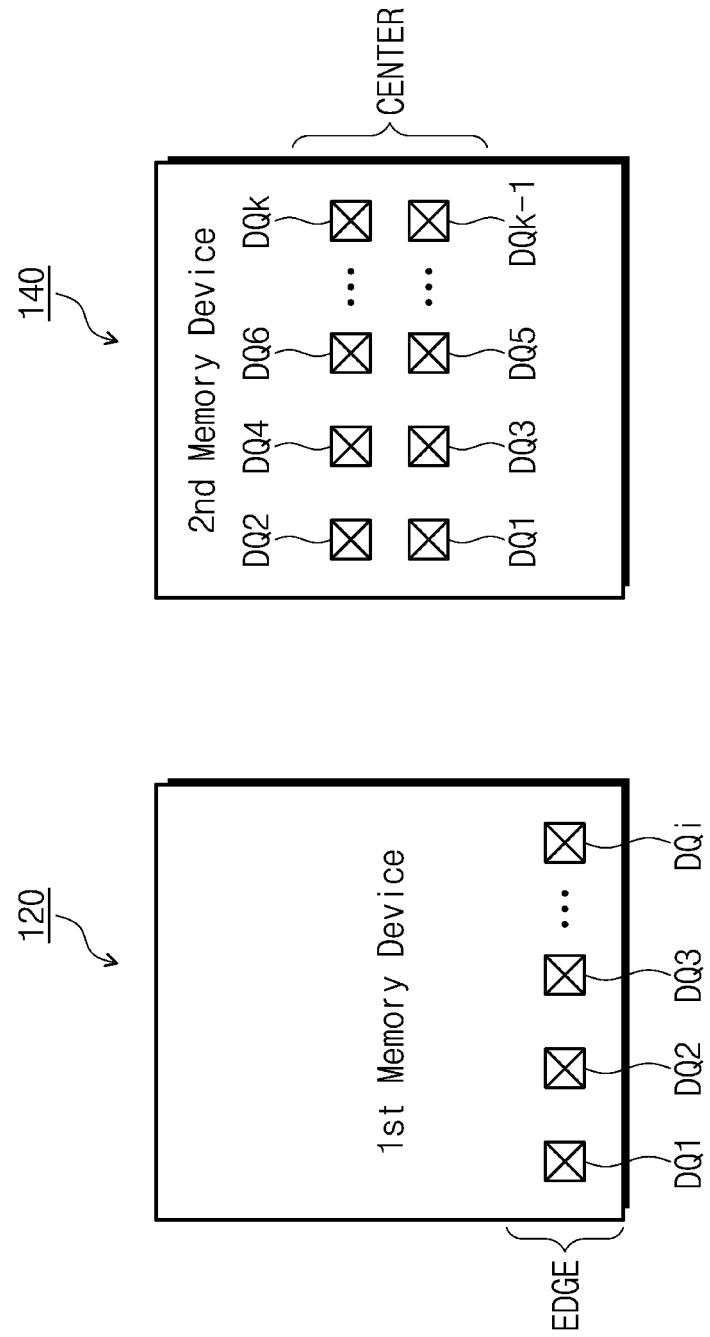

In an example embodiment, because the number of planes of the second memory device 140 is more than the number of planes of the first memory device 120, layouts of DQ signal pins of the first and second memory devices 120 and 140 may be different from each other. For example, as illustrated in FIG. 5C, DQ signal pins (i.e., DQ pads) DQ1 to DQi of the first memory device 120 may be arranged in an edge area EDGE of the first memory device 120. In contrast, DQ signal pins (i.e., DQ pads) DQ1 to DQk of the second memory device 140 may be arranged in a center area CENTER of the second memory device 140. As the DQ signal pins DQ1 to DQk of the second memory device 140 are arranged in the center area CENTER of the second memory device 140, a physical distance between the DQ signal pins DQ1 to DQk and the plurality of planes PL1 to PLn may decrease, thus making a high-speed operation of the second memory device 140 possible.

In an example embodiment, as illustrated in FIG. 5D, a second memory device 140-1 may further include a multiply accumulate (MAC) module 142. The MAC module 142 may be configured to perform a MAC operation on the weight WT stored in the second memory device 140-1 and to output a result of the MAC operation through the plurality of data lines DQ1 to DQk. For example, as described with reference to FIG. 3, the machine learning core 132 of the second controller 130 may be configured to perform the MAC operation on the weight WT. In this case, in the case where the second memory device 140-1 outputs the result of the MAC operation performed on the weight WT, the burden on the MAC operation to be performed by the second controller 130 may decrease. That is, based on a way to implement the storage device 100, a MAC module may be included in the second memory device 140 or may be included in the second controller 130.

In an example embodiment, a plurality of memory blocks constituting planes included in the first and second memory devices 120 and 140 may include memory cells of the same cell type (e.g., CTF memory cells). For example, the memory blocks constituting the planes included in the first and second memory devices 120 and 140 may be implemented to be similar to a memory block BLK illustrated in FIG. 6.

In an example embodiment, a memory block of a three-dimensional structure will be described with reference to FIG. 6, but the disclosure is not limited thereto. A memory block according to the disclosure may have a two-dimensional memory block structure. In an example embodiment, the memory block BLK illustrated in FIG. 6 may be a physical erase unit of the first and second memory devices 120 and 140. However, the disclosure is not limited thereto. For example, an erase unit may be changed to a page unit, a word line unit, a sub block unit, etc.

Referring to FIG. 6, a memory block BLK may include a plurality of cell strings CS11, CS12, CS21, and CS22. The plurality of cell strings CS11, CS12, CS21, and CS22 may be arranged along a row direction and a column direction to form rows and columns.

Each of the plurality of cell strings CS11, CS12, CS21, and CS22 includes a plurality of cell transistors. For example, each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2. In an example embodiment, each of the plurality of cell transistors included in the cell strings CS11, CS12, CS21, and CS22 may be a charge trap flash (CTF) memory cell.

In each cell string, the plurality of memory cells MC1 to MC8 may be serially connected and may be stacked in a direction perpendicular (i.e., in a height direction) to a plane defined by the row direction and the column direction. The string selection transistors SSTa and SSTb may be serially connected, and the serially connected string selection transistors SSTa and SSTb may be interposed between the memory cells MC1 to MC8 and a bit line BL1, BL2. The ground selection transistors GSTa and GSTb may be serially connected and may be interposed between the memory cells MC1 to MC8 and a common source line CSL.

In an example embodiment, in each cell string, the first dummy memory cell DMC1 may be interposed between the memory cells MC1 to MC8 and the ground selection transistors GSTa and GSTb. In an example embodiment, the second dummy memory cell DMC2 may be disposed between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL. In an example embodiment, ground selection transistors in the same row may be connected to the same ground selection line, and ground selection transistors in different rows may be connected to different ground selection lines. For example, the first ground selection transistors GSTa of the cell strings CS11 and CS12 in the first row may be connected to a first ground selection line, and the first ground selection transistors GSTa of the cell strings CS21 and CS22 in the second row may be connected to a second ground selection line.

In an example embodiment, although not illustrated in FIG. 6, ground selection transistors provided at the same height from a substrate (not illustrated) may be connected to the same ground selection line, and ground selection transistors provided at different heights may be connected to different ground selection lines.

Memory cells of the same height from the substrate or the ground selection transistors GSTa and GSTb are connected in common to the same word line, and memory cells of different heights therefrom are connected to different word lines. For example, the memory cells MC1 to MC8 of the cell strings CS11, CS12, CS21, and CS22 may be connected to first to eighth word lines WL1 to WL8, respectively.

String selection transistors, which belong to the same row, from among the first string selection transistors SSTa of the same height are connected to the same string selection line, and string selection transistors belonging to different rows are connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL2a.

Likewise, second string selection transistors, which belong to the same row, from among the second string selection transistors SSTb at the same height may be connected to the same string selection line, and second string selection transistors in different rows may be connected to different string selection lines. For example, the second string selection transistors SSTb of the cell strings CS11 and CS12 in the first row may be connected in common to a string selection line SSL1b, and the second string selection transistors SSTb of the cell strings CS21 and CS22 in the second row may be connected in common to a string selection line SSL2b.

In an example embodiment, dummy memory cells of the same height are connected with the same dummy word line, and dummy memory cells of different heights are connected with different dummy word lines. For example, the first dummy memory cells DMC1 are connected to a first dummy word line DWL1, and the second dummy memory cells DMC2 are connected to a second dummy word line DWL2.

Figure 7:
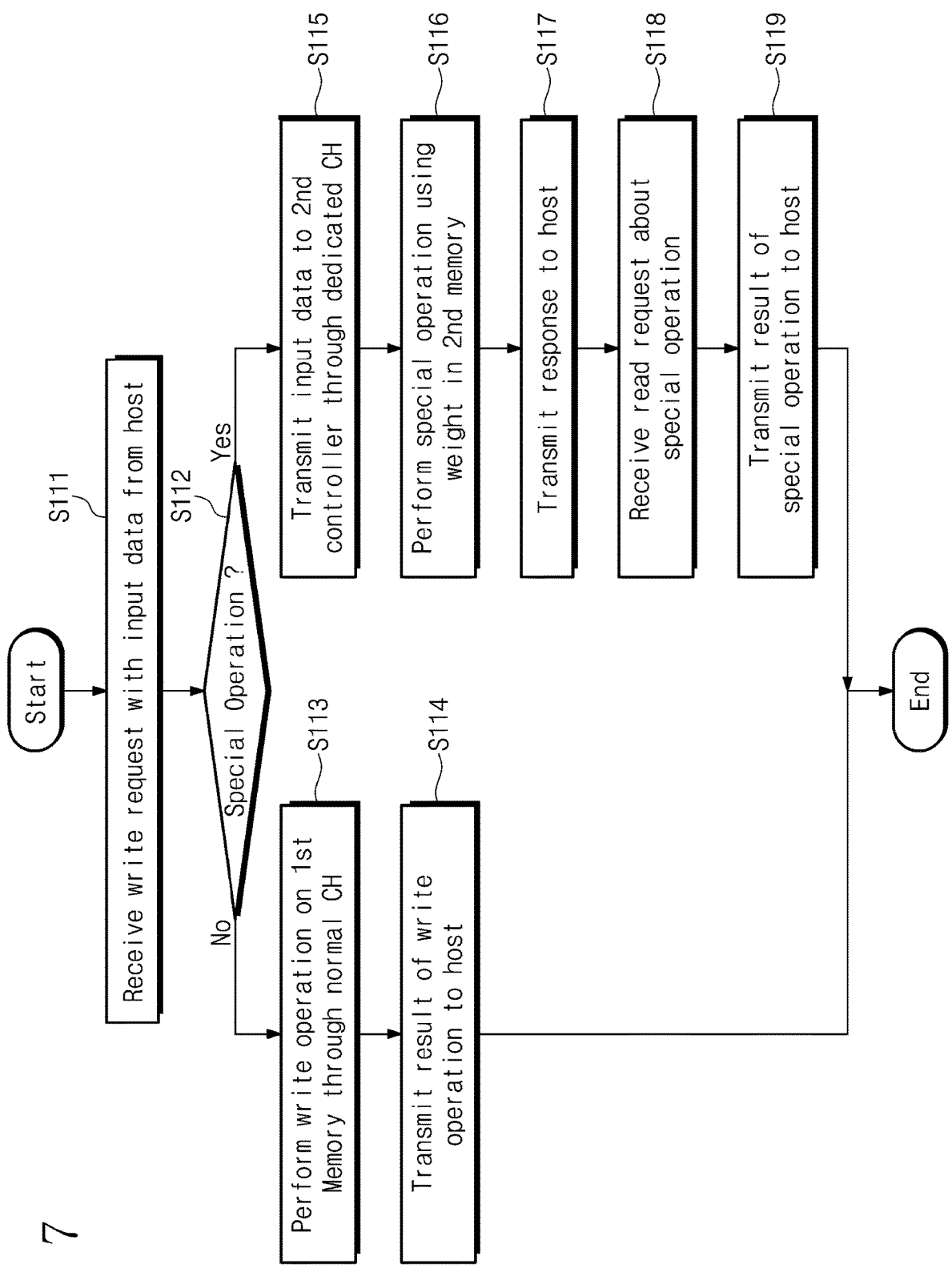
FIG. 7 is a flowchart illustrating an operation of a storage device of FIG. 1.

In an example embodiment, the memory block BLK illustrated in FIG. 6 is only an example. The number of cell strings may increase or decrease, and the number of rows of cell strings and the number of columns of cell strings may increase or decrease depending on the number of cell strings. Also, in the memory block BLK, the number of cell transistors (GST, MC, DMC, SST, etc.) may increase or decrease, and a height of the memory block BLK may increase or decrease depending on the number of cell transistors (GST, MC, DMC, SST, etc.). In addition, the number of lines (GSL, WL, DWL, SSL, etc.) connected with cell transistors may increase or decrease as the number of cell transistors increases or decreases FIG. 7 is a flowchart illustrating an operation of a storage device of FIG. 1. Below, to describe a technical idea of the disclosure easily, it is assumed that the storage device 100 receives a write request and data from the host 11. However, the disclosure is not limited thereto.

Referring to FIGS. 1 and 7, in operation S111, the storage device 100 may receive the write request and input data from the host 11. For example, the host 11 may transmit the write request to the storage device 100 in order to transmit the input data (e.g., user data or special data) to the storage device 100.

In operation S112, the storage device 100 may determine whether the received write request is associated with the special operation. For example, the input/output router 111 of the first controller 110 in the storage device 100 may determine whether the received write request is associated with the normal operation or is associated with the special operation, based on address information corresponding to the received write request, logical unit information, or attributes of the write request. Operation S112 will be more fully described with reference to FIGS. 8A to 8D.

When the received write request is not associated with the special operation (i.e., the received write request is associated with the normal operation), in operation S113, the storage device 100 may perform a write operation (or a program operation) on the first memory device 120 through the normal channel CH_n. For example, the first controller 110 may transmit the received input data (i.e., the user data UDT) to the first memory device 120 in response to the write request received from the host 11 and the first memory device 120 may perform the program operation on the received user data UDT.

In operation S114, the storage device 100 may transmit a result of the write request to the host 11. For example, the first controller 110 may receive a result (e.g., a program pass/fail) of the program operation of the first memory device 120 and may transmit information corresponding to the received result to the host 11 as a response to the write request. In an example embodiment, in the case where the result of the program operation of the first memory device 120 indicates the program fail, the storage device 100 may again perform the program operation on the user data UDT.

When the determination result of operation S112 indicates that the received write request is associated with the special operation, in operation S115, the storage device 100 may transmit the input data (i.e., the special data SDT) to the second controller 130 through the dedicated channel CH_d.

In operation S116, the storage device 100 may perform the special operation on the special data SDT by using the weight WT stored in the second memory device 140. For example, the second controller 130 may read the weight WT from the second memory device 140 through the second memory interface IF2 and may perform the special operation on the special data SDT provided through the dedicated channel CH_d of the first memory interface IF1 by using the read weight WT.

In an example embodiment, as described above, the first controller 110 may use the program command in order to provide the special data SDT to the second controller 130. That is, the second controller 130 may receive the program command and the special data SDT from the first controller 110 through the dedicated channel CH_d and may perform the special operation on the received special data SDT in response to the received program command, but the disclosure is not limited thereto.

In operation S117, the storage device 100 may transmit a response to the host 11. For example, in the case where the second controller 130 completes the special operation, the first controller 110 of the storage device 100 may transmit a response to the received write request to the host 11.

In operation S118, the storage device 100 may receive a read request for the special operation from the host 11. For example, in response to the response (i.e., a response indicating completion of the special operation) from the storage device 100, the host 11 may transmit the read request for reading the result data RDT associated with the special operation to the storage device 100. In an example embodiment, the read request of operation S118 may include dedicated address information, dedicated logical unit information, etc. for accessing the second controller 130 which will be described with reference to FIGS. 8A to 8D, or may be a dedicated read request.

In operation S119, the storage device 100 may transmit the result (i.e., the result data RDT) of the special operation to the host 11 in response to the received read request.

FIGS. 8A to 8D are diagrams for describing a determination operation of operation S112 of FIG. 5. Components which are unnecessary to describe the technical idea of the disclosure are omitted for a brief description. In an example embodiment, embodiments illustrated in FIGS. 8A to 8D are exemplary, but the disclosure is not limited thereto.

Figure 8A:
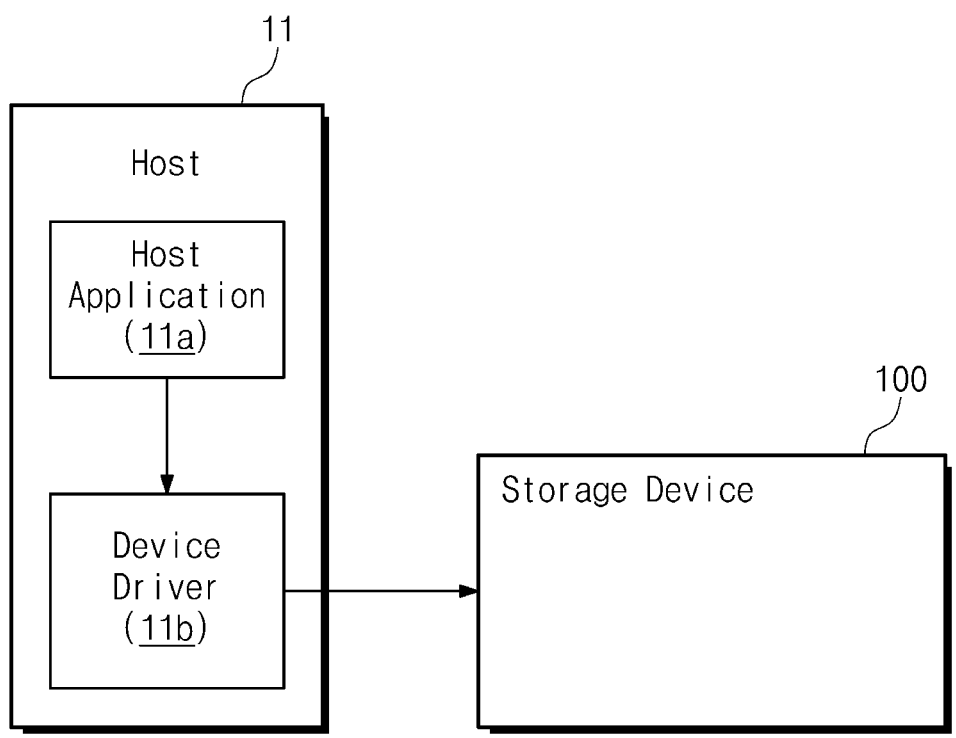
FIGS. 8A to 8D are diagrams for describing a determination operation of operation 112 of FIG. 5.

Referring to FIG. 8A, the host 11 may include a host application 11a and a device driver 11b. The host application 11a may include an operating system or various application programs which are driven on the host 11.

The device driver 11b may be configured to access the storage device 100 in response to a request of the host application 11a. For example, the device driver 11b may be configured to convert information provided from the host application 11a to information capable of being identified by the storage device 100, such that an operation requested by the host application 11a may be performed on the storage device 100 or to manage the information provided from the host application 11a. In an example embodiment, dedicated address information, dedicated logical unit information, a dedicated request, etc. described with reference to FIGS. 8B to 8D may be converted or managed by the device driver 11b.

Figure 8B:
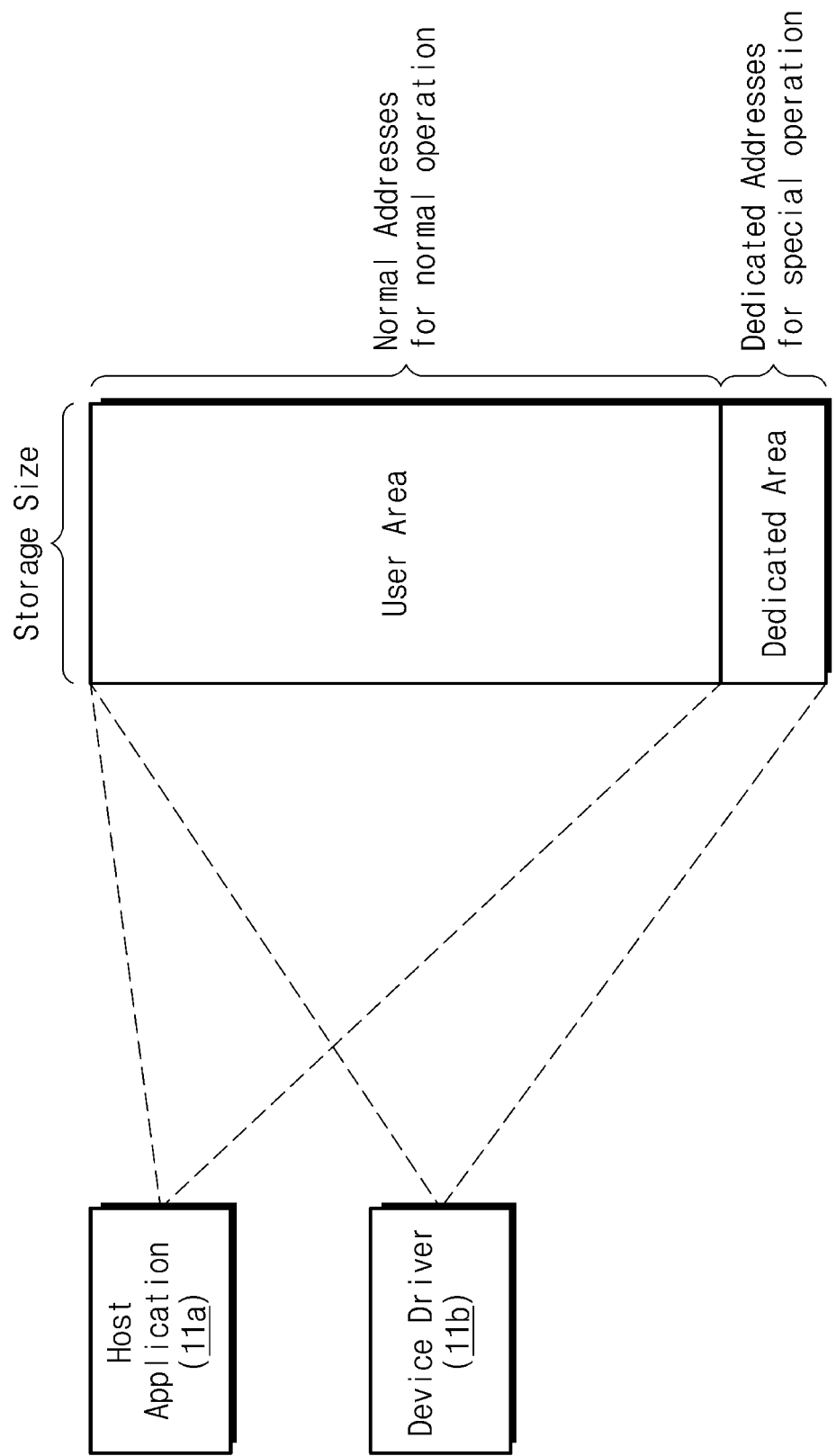

Referring to FIGS. 1, 8A, and 8B, the host 11 may recognize a storage area of the storage device 100 as illustrated in FIG. 8B. For example, a storage space of the storage device 100 may include a user area and a dedicated area. The user area may correspond to a space of the storage device 100 in which the user data UDT may be stored and the dedicated area may correspond to a separate space determined in advance or a virtual space.

The host 11, in detail, the host application 11a of the host 11 may perform an access to the user area of the storage device 100. That is, the host application 11a may perform an operation on the user area of the storage device 100 such as an operation of writing data, reading data, or erasing data.

In contrast, the device driver 11b of the host 11 may recognize the user area and the dedicated area of the storage device 100. In the case where the host application 11a requests the normal operation (e.g., an operation of reading user data or an operation of writing user data) from the storage device 100, the device driver 11b may transmit a request including a normal address of the user area to the storage device 100. In this case, the storage device 100 may perform the normal operation on an area corresponding to the received normal address among the user area.

In the case where the host application 11a requests the special operation, the device driver 11b may transmit a request including a dedicated address of the dedicated area to the storage device 100. In this case, the storage device 100 may perform the special operation in response to the dedicated address included in the received request. That is, the first controller 110 of the storage device 100 may provide the second controller 130 with input data (i.e., the special data SDT) corresponding to the request having the dedicated address.

Figure 8C:
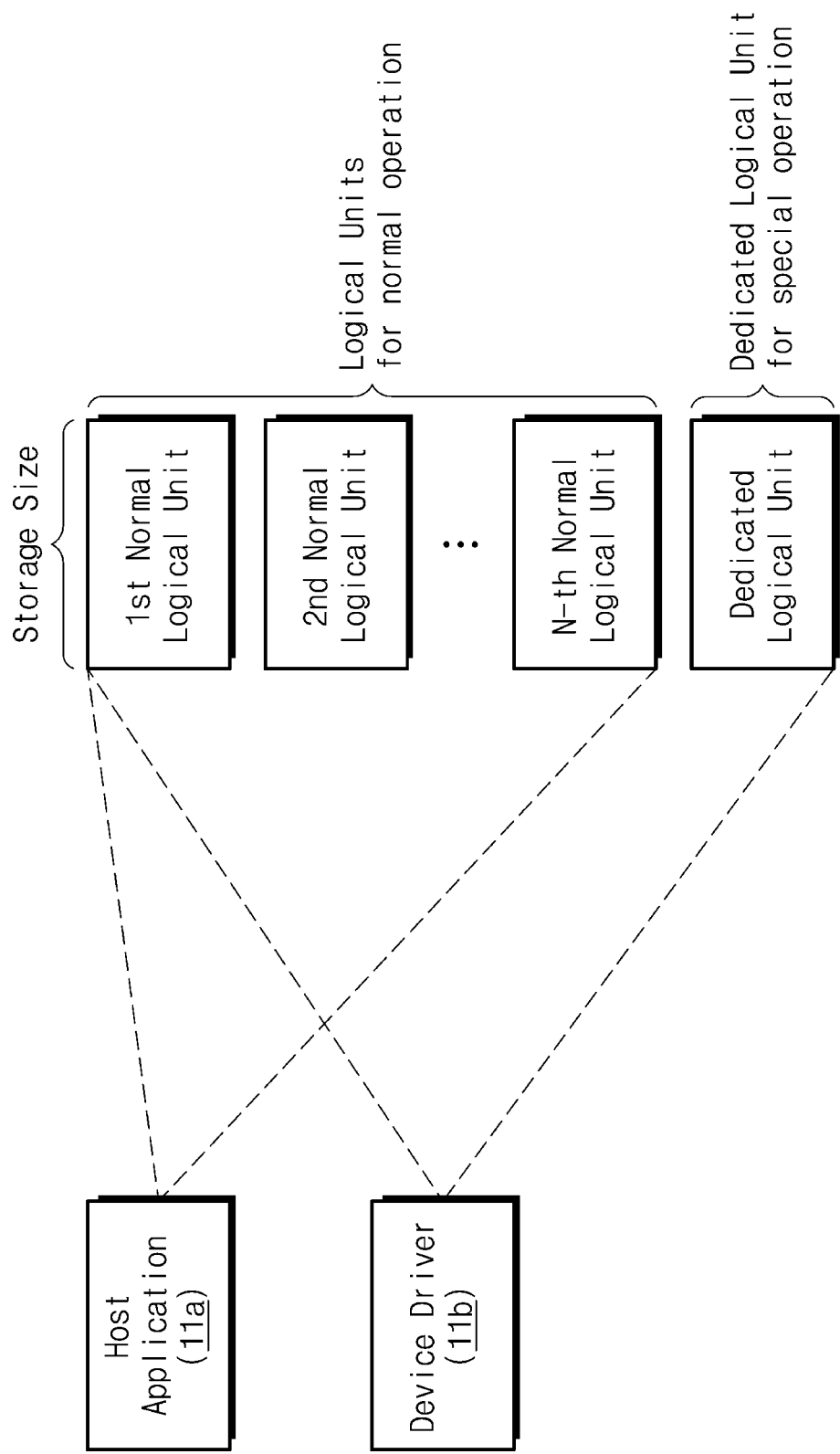

Referring to FIGS. 1, 8A, and 8C, the storage area of the storage device 100 may be divided into a plurality of logical units. In an example embodiment, the logical unit may indicate an externally addressable, independent, or processing entity which may independently process a request from the host 11.

The host application 11a may recognize the storage space of the storage device 100 as first to n-th logical units. In contrast, the device driver 11b may recognize the storage space of the storage device 100 as the first to n-th logical units and a dedicated logical unit.

As in the description given with reference to FIG. 8B, in the case where the host application 11a requests the normal operation of the storage device 100, the device driver 11b may transmit a request including information about any one of the first to n-th logical units to the storage device 100. In response to the request including information about any one of the first to n-th logical units, the storage device 100 may perform the normal operation on the one logical unit.

In the case where the host application 11a requests the special operation, the device driver 11b may transmit a request including information about the dedicated logical unit to the storage device 100. The storage device 100 may perform the special operation in response to the request including the information about the dedicated logical unit.

Figure 8D:
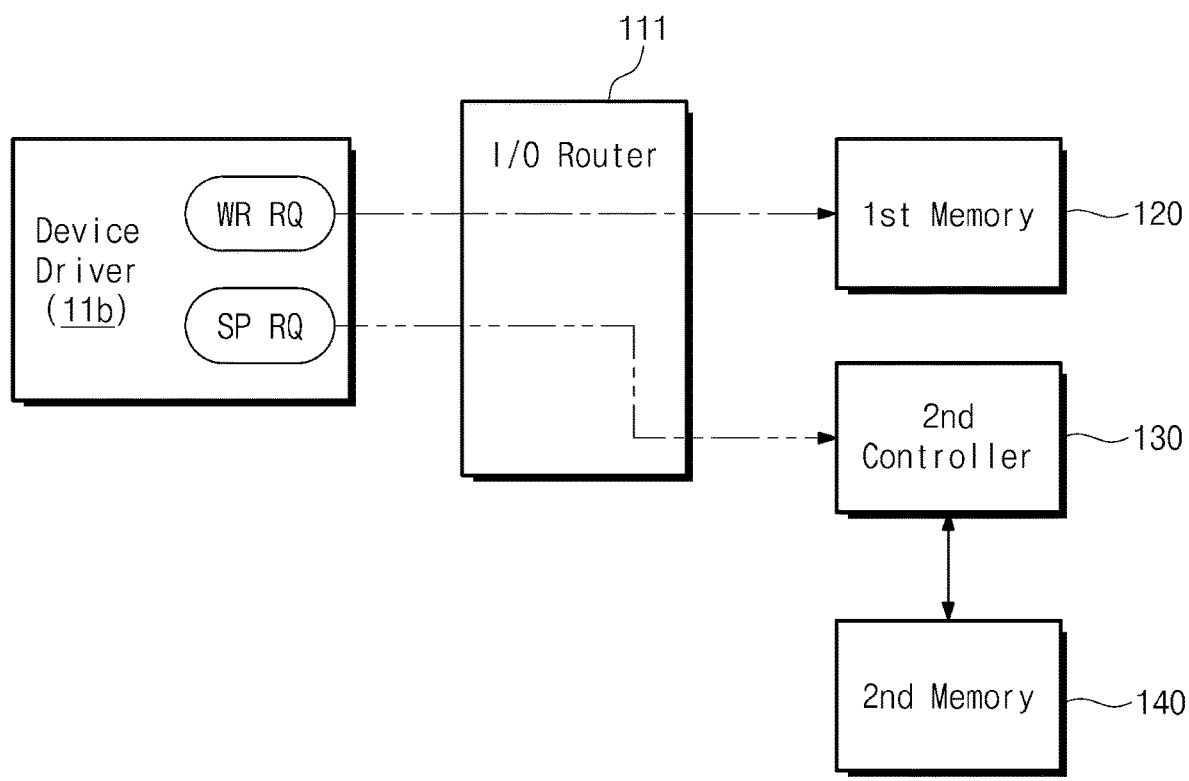

Referring to FIGS. 1, 8A, and 8D, the device driver 11b may transmit a request for the normal operation and a request for the special operation to the storage device 100 so as to be distinguished explicitly. For example, in the embodiments described with reference to FIGS. 8B and 8C, the device driver 11b may issue a request for the special operation by adding information about a dedicated address or information about a dedicated logical unit to a normal write command.

In contrast, in the embodiment illustrated in FIG. 8D, the device driver 11b may issue the request for the special operation explicitly distinguished from the request for the normal operation. That is, in the case where a write request WR RQ is received from the device driver 11b, the input/output router 111 of the storage device 100 may provide the received write request WR RQ to the first memory device 120. In the case where a special operation request SP RQ explicitly distinguished from the write request WR RQ is received from the device driver 11b, the input/output router 111 may provide the received special operation request SP RQ to the second controller 130.

In an example embodiment, the special operation request SP RQ may be a request defined by a protocol between the host 11 and the storage device 100, one of commands defined by the protocol, a reserved command, or a vendor specific command. Alternatively, the special operation request SP RQ may be issued by setting a specific value to a reserved field of a special request or command.

The configurations described with reference to FIGS. 8A to 8D are examples for describing the technical idea of the disclosure easily, and the disclosure is not limited thereto. Various ways to distinguish the normal operation and the special operation may be used in compliance with a protocol determined in advance between the host 11 and the storage device 100.

The embodiments are described with reference to FIGS. 8A to 8D as the device driver 11b of the host 11 performs management for distinguishing the normal operation and the special operation, but the disclosure is not limited thereto. For example, the host application 11a of the host 11 may be configured to perform the above-described operation of the device driver 11b.

Figure 9A:
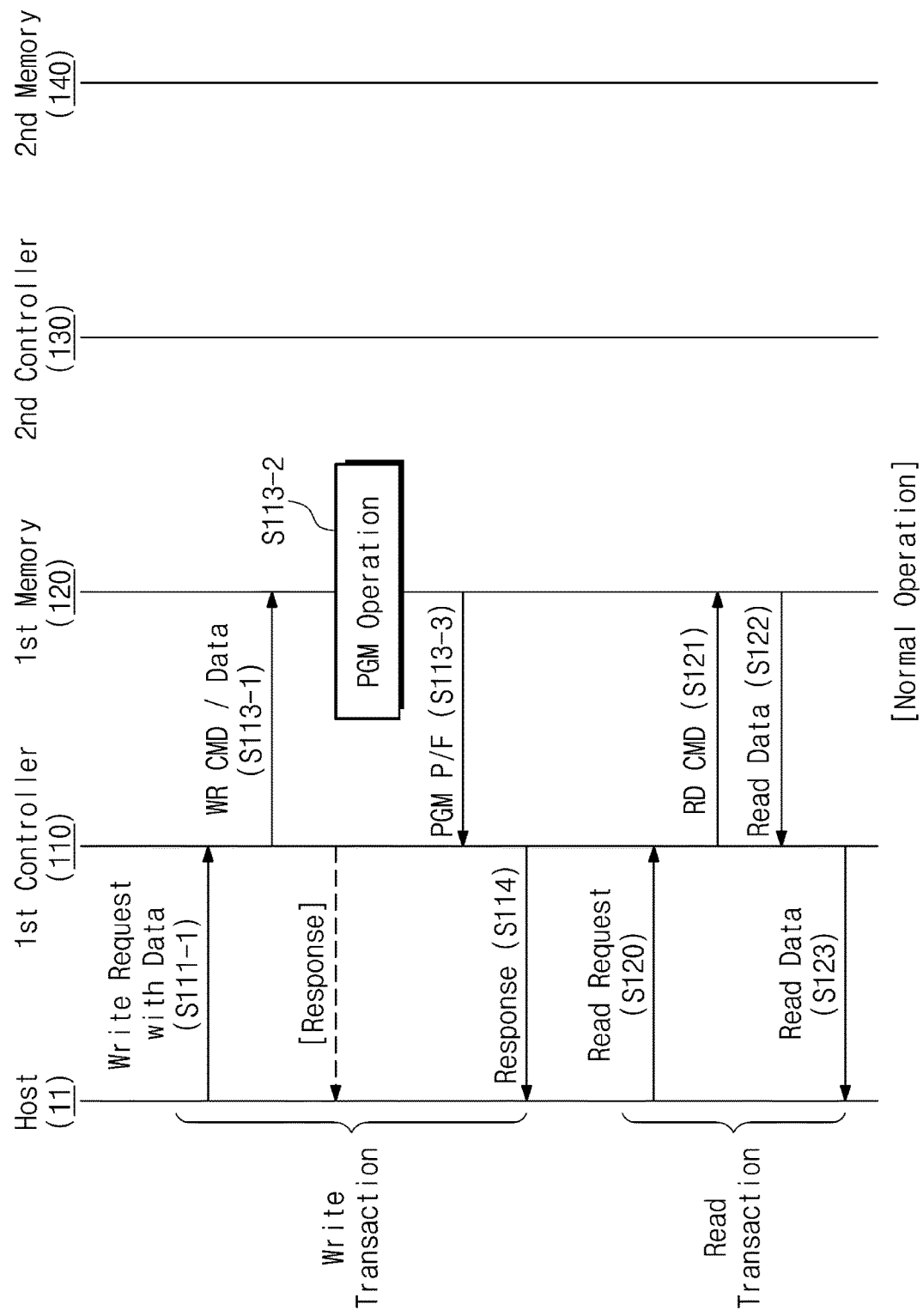
FIGS. 9A and 9B are flowcharts illustrating operations of a host and a storage device of FIG. 1 in detail.
Figure 9B:
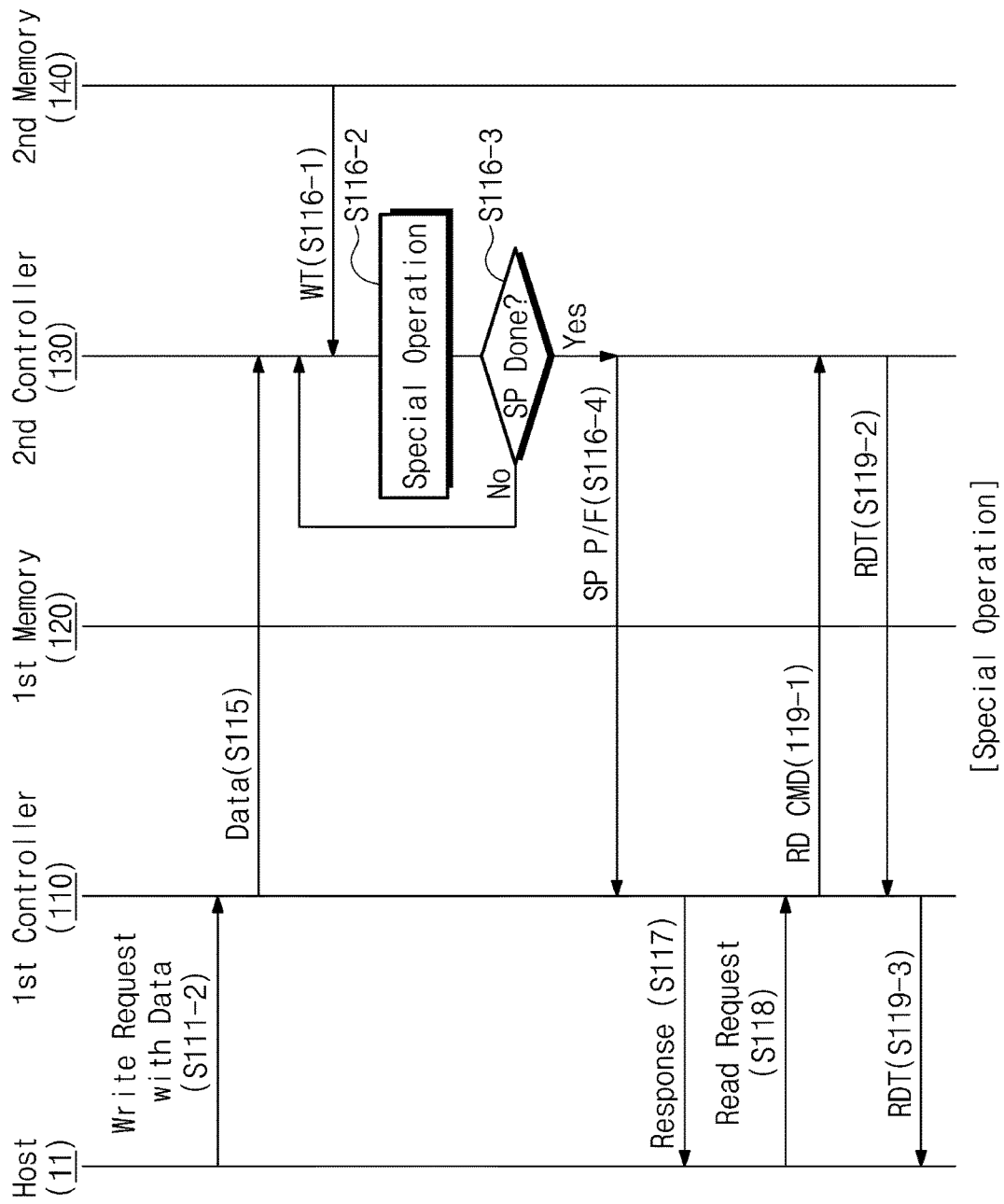

FIGS. 9A and 9B are flowcharts illustrating operations of a host and a storage device of FIG. 1 in detail. The normal operation of the storage device 100 will be described with reference to FIG. 9A, and the special operation of the storage device 100 will be described with reference to FIG. 9B. Components which are unnecessary to describe the technical idea of the disclosure are omitted for a brief description.

Referring to FIGS. 1, 7, and 9A, in operation S111-1, the host 11 may transmit a write request to the first controller 110 together with data (i.e., the user data UDT) for the purpose of writing the data in the storage device 100. For example, the host 11 may transmit the write request to the first controller 110 together with the data, based on a way to communicate with the storage device 100 in compliance with a protocol determined in advance. In this case, as described with reference to FIGS. 8A to 8D, the write request may be a normal write request, may include normal address information, or may include information about any one of the first to n-th logical units.

In operation S113-1, the first controller 110 may transmit a write command WR CMD and data to the first memory device 120 in response to the received write request. For example, in the case where the received write request is associated with the normal operation, the first controller 110 may transmit the write command WR CMD and the data to the first memory device 120 through the normal channel CH_n of the first memory interface IF1, in response to the received write request.

In operation S113-2, the first memory device 120 may perform the program operation (i.e., the write operation) on the received data in response to the received write command WR CMD. In operation S113-3, the first controller 110 may receive information about a result (i.e., a program pass/fail PGM P/F) of the program operation from the first memory device 120. In operation S114, the first controller 110 may transmit a response to the write request to the host 11.

Although not illustrated in drawings, in the case where the result of the program operation received in operation S113-3 indicates the program fail, the first controller 110 may transmit a command for redoing the program operation to the first memory device 120.

In an example embodiment, the first controller 110 may transmit a response to the host 11 before directly writing the data received in operation S111-1 in the first memory device 120. For example, the first controller 110 may transmit a response to the host 11 after storing the above-described data in a separate buffer memory. Afterwards, the first controller 110 may program the data stored in the separate buffer memory in the first memory device 120. Operations S111-1 through S114 may constitute a write transaction.

In operation S120, the host 11 may transmit a read request to the storage device 100 for the purpose of reading data (e.g., user data UDT) stored in the storage device 100. In operation S121, the first controller 110 may transmit a read command RD CMD to the first memory device 120 in response to the read request. In operation S122, the first controller 110 may receive read data from the first memory device 120. In operation S123, the first controller 110 may transmit the read data to the host 11. In an example embodiment, the read data may be data corresponding to address information included in the read request received in operation S120. Operations S120 through S123 may constitute a read transaction.

Referring to FIGS. 1, 7, and 9B, in operation S111-2, the host 11 may transmit a write request and data to the first controller 110 for the purpose of performing the special operation. In this case, as described with reference to FIGS. 8B and 8C, the write request may include information about a dedicated address or information about a dedicated logical unit. Alternatively, as described with reference to FIG. 8D, the write request may be a request (i.e., a special request SP RQ of FIG. 8D) explicitly distinguished from the normal write request.

In operation S115, the first controller 110 may transmit the received data (i.e., the special data SDT) to the second controller 130 through the dedicated channel CH_d of the first memory interface IF1. In an example embodiment, the first controller 110 may use a program command in order to transmit the received data to the second controller 130.

In operation S116-1, the second controller 130 may read the weight WT from the second memory device 140 through the second memory interface IF2. In operation S116-2, the second controller 130 may perform the special operation on the received data (i.e., the special data SDT) by using the read weight WT. In operation S116-3, the second controller 130 may determine whether the special operation is completed. When the special operation is not completed, the second controller 130 performs operation S116-1. That is, as described with reference to FIG. 3, the second controller 130 may read the weight WT from the second memory device 140 and may repeatedly perform the special operation on the received data in the unit of a frame, based on the read weight WT.

When the special operation is completed, the second controller 130 may transmit, in operation S116-4, a result of the special operation (i.e., a special operation pass/fail SP P/F) under control of the first controller 110. In an example embodiment, the first controller 110 may read the result of the special operation from the second controller 130 through a status read operation.

In operation S117, the first controller 110 may transmit a response to the write request of operation S111-2 to the host 11. In operation S118, the host 11 may transmit a read request for reading the result (i.e., the result data RDT) of the special operation to the first controller 110 in response to the response of operation S117. In operation S119-1, the first controller 110 may transmit the read command RD CMD to the second controller 130. In operation S119-2, the second controller 130 may transmit the result data RDT to the first controller 110 in response to the read command RD CMD. In operation S119-3, the first controller 110 may transmit the result data RDT to the host 11.

In an example embodiment, as in the description given with reference to FIGS. 8A to 8D, the read request of operation S118 may include information about a dedicated address or information about a dedicated logical unit or may be a request explicitly distinguished from the normal read request.

In an example embodiment, before the read request of operation S118 is received, the first controller 110 may in advance perform operation S119-1 and operation S119-2.

As described above, the storage device 100 according to an embodiment of the disclosure may perform the normal operation (e.g., an operation of reading, writing, or erasing user data) and the special operation (e.g., voice recognition, image classification, or image identification). Accordingly, because the burden on an operation of a host or the use of a data center for performing the special operation (e.g., an operation based on machine learning or artificial intelligence) decreases, a storage device having an improved performance and reduced costs is provided.

FIG. 10 is a flowchart illustrating an operation of a storage device of FIG. 1. Referring to FIGS. 1 and 10, the storage device 100 may perform operation S121 to operation S126. Operation S121 to operation S126 may be similar to operation S111 to operation S116 of FIG. 5, and thus, additional description will be omitted to avoid redundancy.

In operation S127, the storage device 100 may transmit a response including a result of the special operation to the host 11. For example, the storage device 100 may transmit the response to the write request of operation S121 to the host 11 in the unit of a packet. In this case, the result of the special operation (i.e., the result data RDT) may be included in the above-described response. The host 11 may receive the response in which the result data RDT are included and may check the result of the special operation based on the received result data RDT, without an additional read operation.

Figure 11:
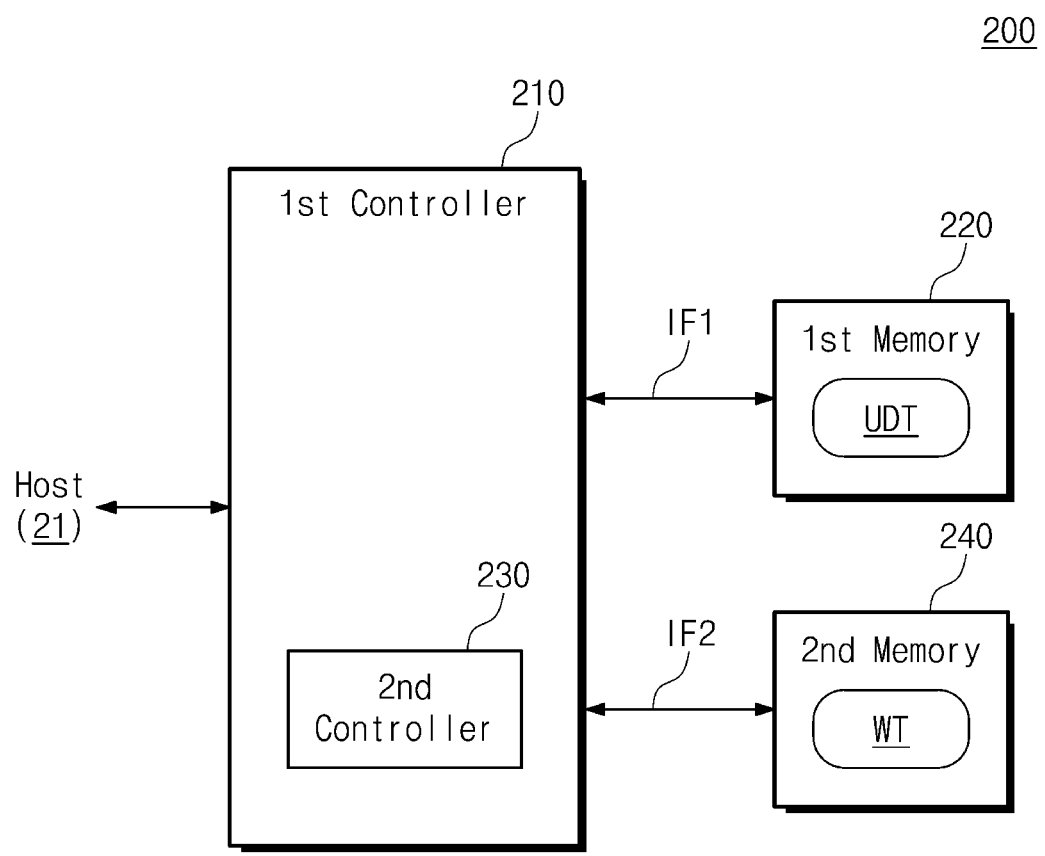
FIG. 11 is a block diagram illustrating a storage device according to an embodiment of the disclosure.

FIG. 11 is a block diagram illustrating a storage device according to an embodiment of the disclosure. Below, for convenience of description, additional description associated with the above-described embodiments will be omitted to avoid redundancy.

Referring to FIG. 11, a storage device 200 may include a first controller 210, a first memory device 220, and a second memory device 240. The first controller 210 may communicate with a host 21. The first controller 210 may communicate with the first memory device 220 storing the user data UDT through the first memory interface IF1 and may communicate with the second memory device 240 storing the weight WT through the second memory interface IF2. In an example embodiment, an operating speed of the second memory interface IF2 may be higher than an operating speed of the first memory interface IF1. The first and second memory devices 220 and 240 may include memory cells of the same type as described above. The number of data pins included in the first memory device 220 may be different from the number of data pins included in the second memory device 240. The first and second memory devices 220 and 240 are described with reference to FIGS. 1 to 6, and thus, additional description will be omitted to avoid redundancy.

In an example embodiment, the first controller 210 may include a second controller 230. The first controller 110 and the second controller 130 described with reference to FIG. 1 may be implemented with a separate semiconductor device, a separate semiconductor die, a separate semiconductor chip, or a separate semiconductor package, but the second controller 230 of FIG. 9 may be included within the first controller 210. Alternatively, the first controller 210 and the second controller 230 of FIG. 9 may be implemented with one semiconductor device, one semiconductor chip, one semiconductor die, or one semiconductor package.

Figure 12:
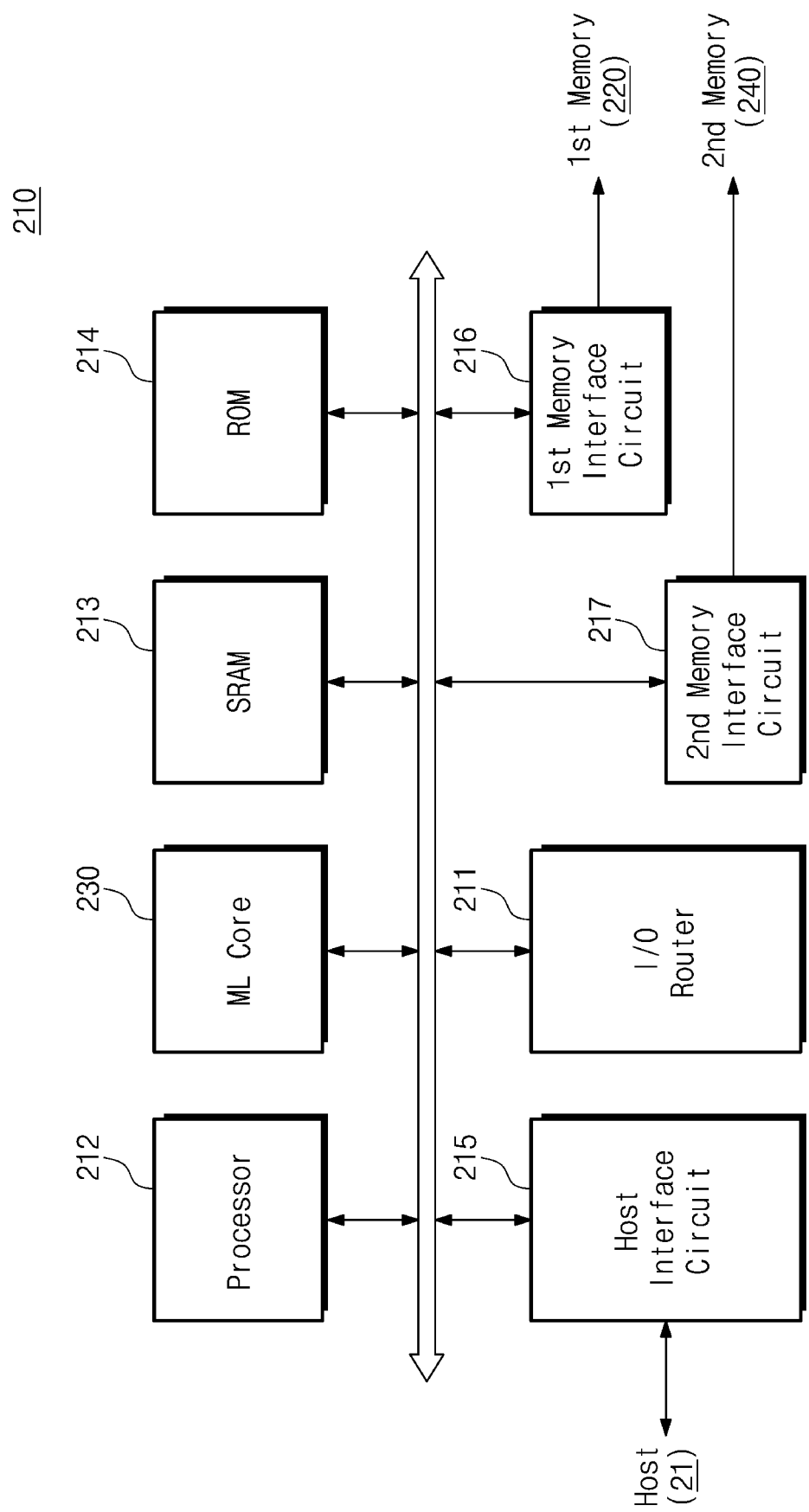
FIG. 12 is a block diagram illustrating a controller of FIG. 11.

FIG. 12 is a block diagram illustrating a controller of FIG. 11. Referring to FIGS. 11 and 12, the first controller 210 may include an input/output router 211, a processor 212, an SRAM 213, a ROM 214, a host interface circuit 215, a first memory interface circuit 216, a second memory interface circuit 217, and a machine learning core 230 (the machine learning core 230 may correspond to the second controller 230).

The input/output router 211, the processor 212, the SRAM 213, the ROM 214, the host interface circuit 215, and the first memory interface circuit 216 are described with reference to FIG. 2, and thus, additional description will be omitted to avoid redundancy.

Unlike the first controller 110 of FIG. 2, the first controller 210 of FIG. 12 may further include the machine learning core 230 and the second memory interface circuit 217. That is, in response to a request for the special operation received from the host 21, the first controller 210 of FIG. 12 may read the weight WT from the second memory device 240 through the second memory interface circuit 217 and may perform the special operation by using the read weight WT.

In an example embodiment, as described above, the first memory interface circuit 216 may be a circuit for supporting a NAND flash interface, and the second memory interface circuit 217 may be a circuit for supporting a high-speed interface. In other words, an operating speed of the second memory interface circuit 217 may be higher than an operating speed of the first memory interface circuit 216.

Figure 13:
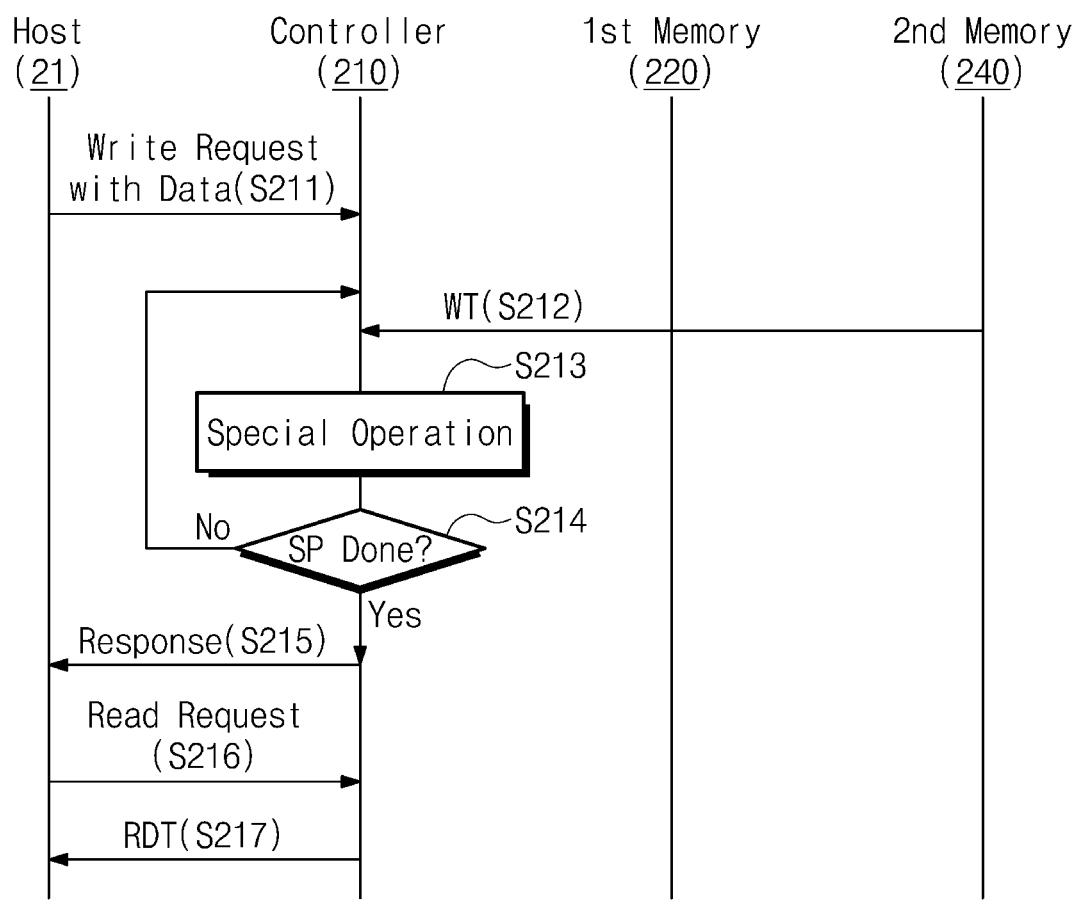
FIG. 13 is a flowchart illustrating an operation of a storage device of FIG. 11.

FIG. 13 is a flowchart illustrating an operation of a storage device of FIG. 11. For a brief description, it is assumed that a write request received from the host 21 is a request for the special operation.

Referring to FIGS. 11 and 13, in operation S211, the host 21 may transmit a write request and data to the first controller 210. For example, to perform the special operation, the host 21 may transmit a write request including information about a dedicated address or information about a dedicated logical unit or a special request explicitly distinguished from the normal write request to the first controller 210.

In operation S212, the first controller 210 may read the weight WT from the second memory device 240 through the second memory interface IF2 in response to the received write request (i.e., a write request for the special operation). In operation S213, the first controller 210 may perform the special operation on the received data (i.e., the special data SDT) by using the weight WT. In operation S214, the first controller 210 may determine whether the special operation is completed; when the special operation is not completed, the first controller 210 performs operation S212.

When the special operation is completed, in operation S215, the first controller 210 may transmit a response to the host 21. In operation S216, the host 21 may transmit a read request to the first controller 210 in response to the received response. In operation S217, the first controller 210 may transmit the result data RDT to the host 21 in response to the read request.

Although not illustrated in drawings, the first controller 210 may transmit a response including the result data RDT to the host 21 as a response to the write request for the special operation. In this case, a read request for reading the result data RDT from the host 21 may be omitted.

Figure 14:
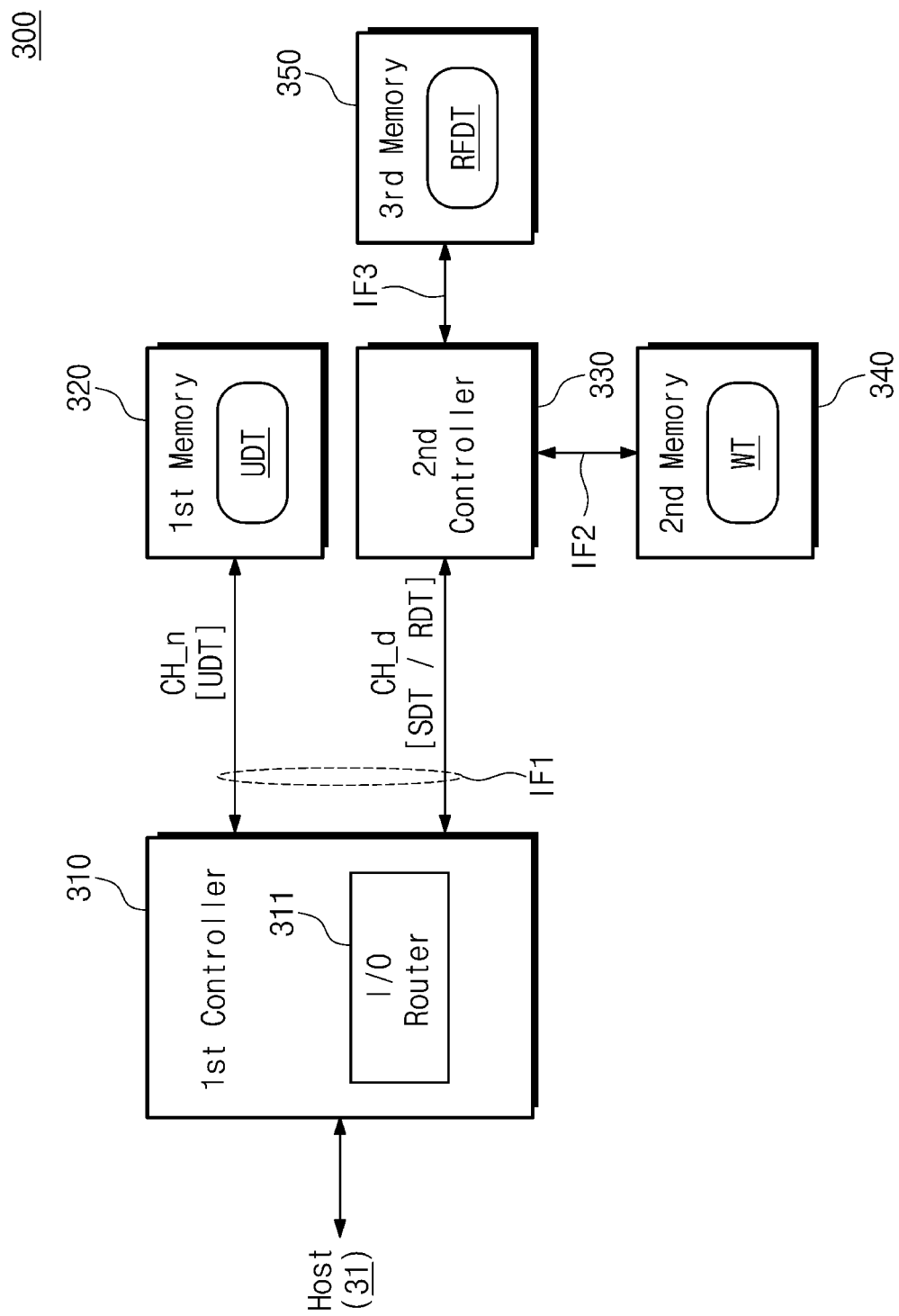
FIGS. 14 to 16 are block diagrams illustrating a storage device according to an embodiment of the disclosure.

FIG. 14 is a block diagram illustrating a storage device according to an embodiment of the disclosure. Referring to FIG. 14, a storage device 300 may include a first controller 310, a first memory device 320, a second controller 330, a second memory device 340, and a third memory device 350. The first controller 310 may communicate with a host 31 and may include an input/output (I/O) router 311. The first controller 310, the first memory device 320, the second controller 330, and the second memory device 340 are described above, and thus, additional description will be omitted to avoid redundancy.

The storage device 300 of FIG. 14 may further include the third memory device 350. The third memory device 350 may include reference data RFDT for the special operation and may communicate with the second controller 330 based on a third memory interface IF3.

In an example embodiment, the third memory interface IF3 may be an interface based on a communication manner different from the second memory interface IF2. The second memory interface IF2 may be a communication manner optimized for a sequential data read operation, and the third memory interface IF3 may be a communication manner optimized for a random data read operation. For example, as described with reference to FIG. 3, in the case where the special operation to be performed by the machine learning core 230 is a voice recognition operation, the reference data RFDT may be data associated with word information for converting an operation result from the acoustic model 132b to a text. In this case, the reference data RFDT may be used by the decoding module 132c described with reference to FIG. 3. In this case, the decoding module 132c may require an operation of randomly reading partial data of the reference data RFDT. In other words, by implementing the third memory interface IF3 based on the communication manner optimized for the random data read operation, the random read performance on the reference data RFDT stored in the third memory device 350 may be optimized.

In an example embodiment, the first, second, and third memory devices 320, 340, and 350 may be implemented with a NAND flash memory device. That is, the first, second, and third memory devices 320, 340, and 350 may be implemented with a memory device including memory cells (e.g., NAND flash memory cells or CTF cells) of the same type as the memory devices described with reference to FIGS. 5A to 6.

Alternatively, at least one of the first, second, and third memory devices 320, 340, and 350 may be a memory device of a different kind. For example, the first memory device 320 may be a memory device appropriate for high-capacity implementation, the second memory device 340 may be a memory device appropriate for a sequential read operation, and the third memory device 350 may be a memory device appropriate for a random read operation. Alternatively, the first and second memory devices may be implemented with a NAND flash memory and the third memory device 340 may be implemented with a random-access memory.

Figure 15:
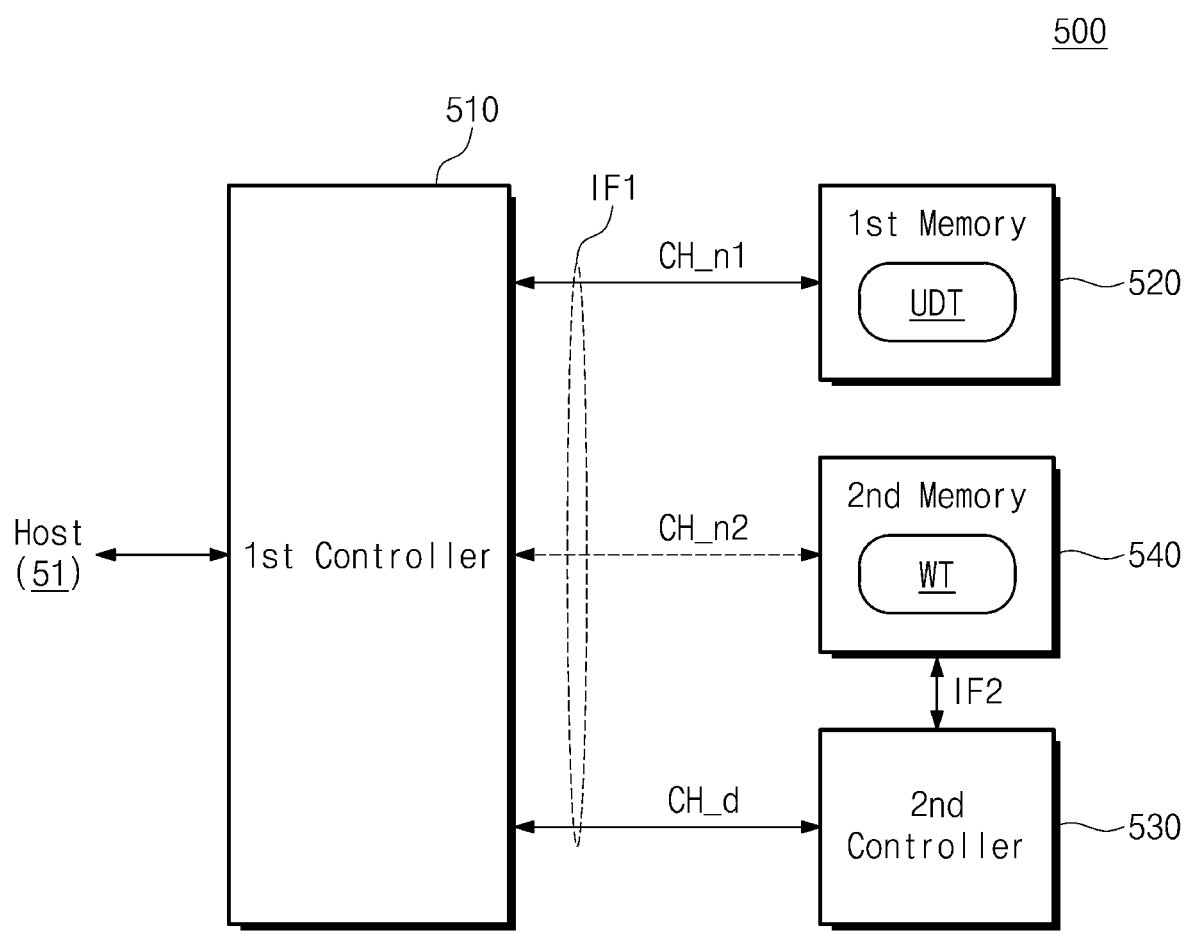

FIG. 15 is a block diagram illustrating a storage device according to an embodiment of the disclosure. Referring to FIG. 15, a storage device 500 may include a first controller 510, a first memory device 520, a second controller 530, and a second memory device 540. The first controller 510 may communicate with a host 51. The components of the storage device 500 are described above, and thus, additional description will be omitted to avoid redundancy.

Unlike the above embodiments, in the embodiment of FIG. 15, the first controller 510 may be configured to access the second memory device 540. For example, the first controller 510 may provide a command for accessing the second memory device 540 to the second controller 530 through the dedicated channel CH_d and the second controller 530 may perform an access operation on the second memory device 540 in response to the received command and may provide a result of the access operation to the first controller 510 through the dedicated channel CH_d. Here, the access operation may be different from the special operation. For example, the access operation on the second memory device 540 may be an operation such as a write operation, a read operation, or an erase operation on the second memory device 540.

In an example embodiment, the first controller 510 may communicate with the second memory device 540 through a second normal channel CH_n2. For example, the first controller 510 may perform the normal operation on the first memory device 520 through a first normal channel CH_n1 and may provide the special data SDT to the second controller 530 through the dedicated channel CH_d. In this case, the first controller 510 may be configured to perform the normal operation on the second memory device 540, in which the weight WT is stored, through the second normal channel CH_n2. In an example embodiment, the first controller 510 may be configured to manage the weight WT stored in the second memory device 540 through the second normal channel CH_n2.

Figure 16:
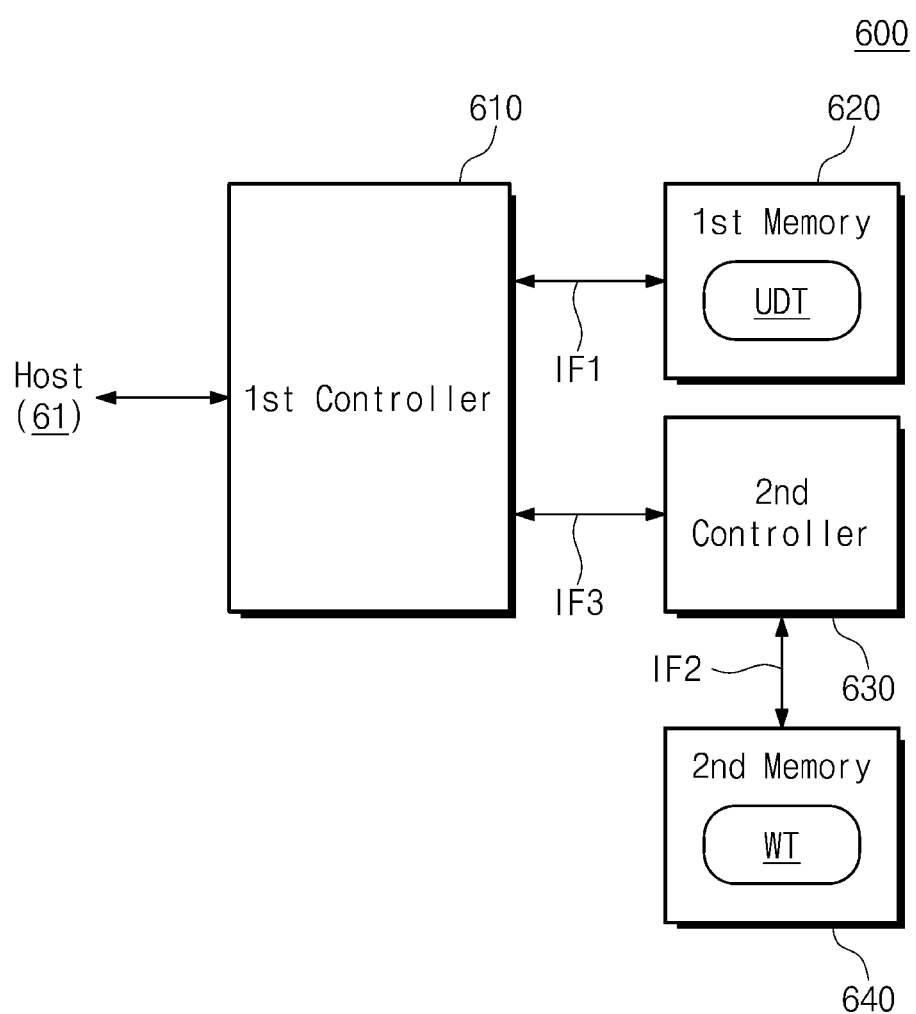

FIG. 16 is a block diagram illustrating a storage device according to an embodiment of the disclosure. Referring to FIG. 16, a storage device 600 may include a first controller 610, a first memory device 620, a second controller 630, and a second memory device 640. The first controller 610 may communicate with a host 61. The components of the storage device 600 are described above, and thus, additional description will be omitted to avoid redundancy.

Unlike the above embodiments, the first controller 610 may communicate with the first memory device 620 through the first memory interface IF1 and may communicate with the second controller 630 through a third memory interface IF3 different from the first memory interface IF1. That is, in the above embodiments, a first controller may communicate with a second controller by using a specific channel included in the first memory interface IF1; however, in the embodiment of FIG. 16, the first controller 610 may further include a separate interface (i.e., the third memory interface IF3) for communicating with the second controller 630.

FIGS. 17A to 17D are block diagrams illustrating a configuration of a storage device according to an embodiment of the disclosure. For brevity of illustration and for convenience of description, a part of storage devices 1000a, 1000b, 1000c, and 1000d is illustrated, but the disclosure is not limited thereto.

Figure 17A:
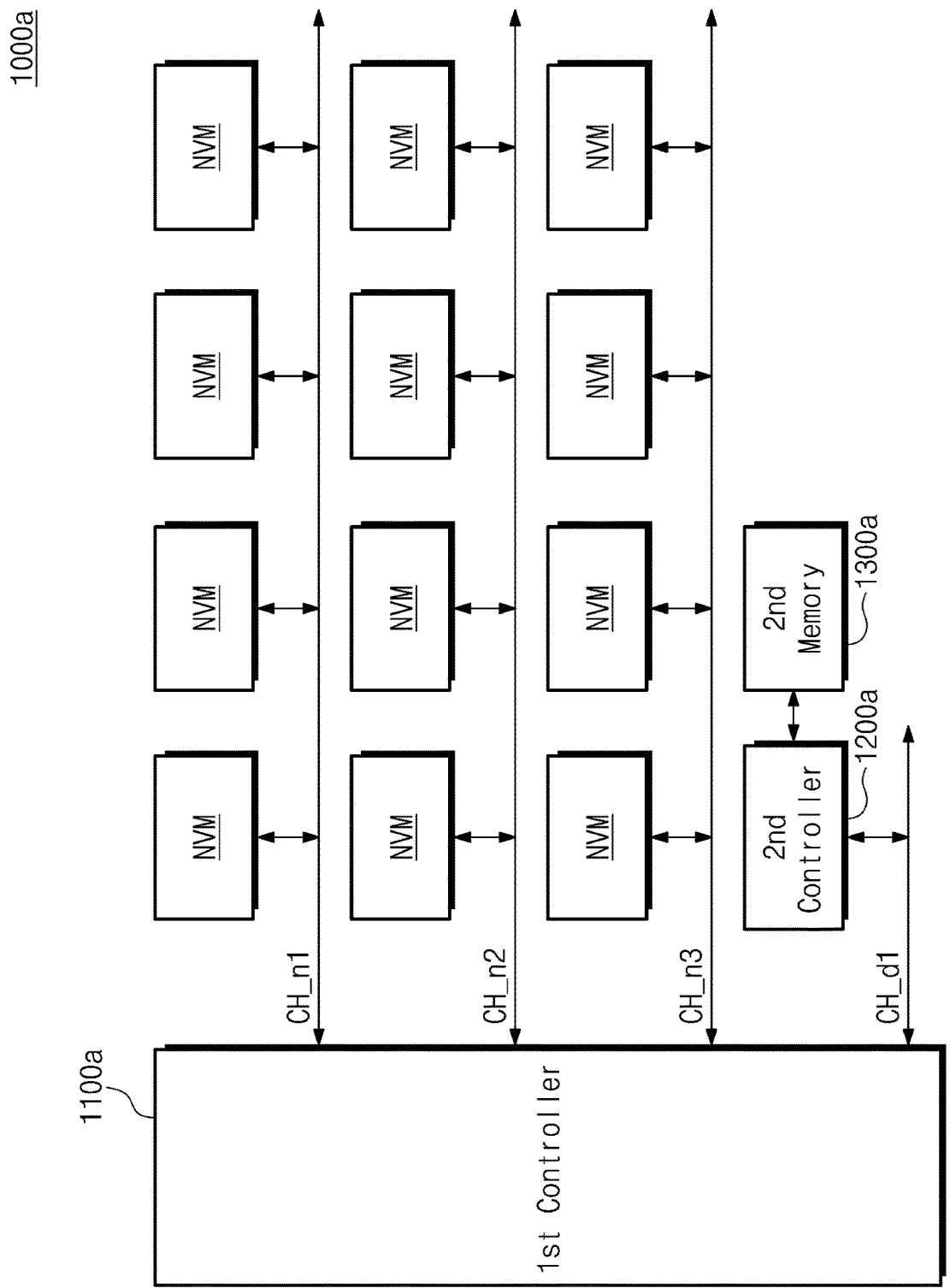
FIGS. 17A to 17D are block diagrams illustrating a configuration of a storage device according to an embodiment of the disclosure.

Referring to FIG. 17A, the storage device 1000a may include a first controller 1100a, a plurality of nonvolatile memory devices NVM, a second controller 1200a, and a second memory device 1300a.

The first controller 1100a may be connected with the plurality of nonvolatile memory devices NVM through first to third channels CH_n1 to CH_n3. The first controller 1100a may be configured to control the first to third channels CH_n1 to CH_n3, independently. In an example embodiment, the plurality of nonvolatile memory devices NVM connected respectively with the first to third channels CH_n1 to CH_n3 may be recognized as a user area (refer to FIG. 6B) by an external device (e.g., a host). That is, the first controller 1100a may perform the normal operation on the plurality of nonvolatile memory devices NVM through the first to third channels CH_n1 to CH_n3.

The first controller 1100a may communicate with the second controller 1200a through a first dedicated channel CH_d1. The second controller 1200a may communicate with the second memory device 1300a including the weight WT through a separate interface.

In an example embodiment, the nonvolatile memory devices NVM connected to the same normal channel may share the same input/output signal lines (e.g., DQ lines). That is, the first to third normal channel CH_n1 to CH_n3 may be distinguished in the unit of input/output lines. The first controller 1100a may select or control the plurality of nonvolatile memory devices NVM respectively by controlling a chip enable signal of each of the plurality of nonvolatile memory devices NVM.

Figure 17B:
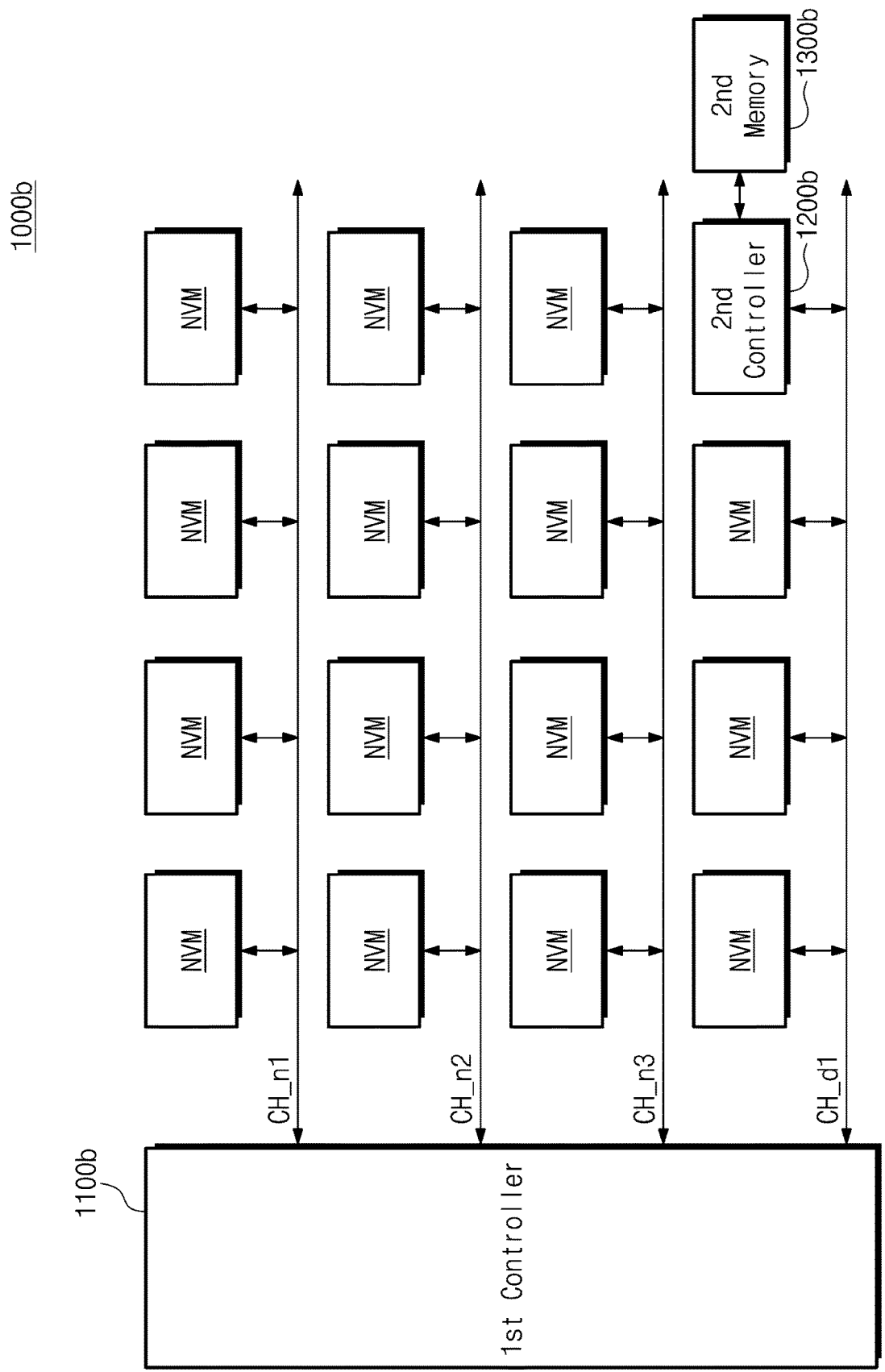

Referring to FIG. 17B, the storage device 1000b may include a first controller 1100b, a plurality of memory devices NVM, a second controller 1200b, and a second memory device 1300b.

The first controller 1100b may individually communicate with the plurality of nonvolatile memory devices NVM through the first to third channels CH_n1 to CH_n3 and a first dedicated channel CH_d1. The second controller 1200b may communicate with the first controller 1100b through the first dedicated channel CH_d1 and may communicate with the second memory device 1300b including the weight WT through a separate interface.

In an example embodiment, as illustrated in FIG. 17B, a plurality of nonvolatile memory devices NVM may be connected to the first dedicated channel CH_d1. In this case, the first controller 1100b may perform the normal operation on the plurality of nonvolatile memory devices NVM connected with the first dedicated channel CH_d1 by controlling a chip enable signal. Also, the first controller 1100b may communicate with the second controller 1200b connected with the first dedicated channel CH_d1 by controlling a chip enable signal.

For example, in the case where the first controller 1100b controls any one of the plurality of nonvolatile memory devices NVM connected with the first dedicated channel CH_d1, the first controller 1100b may control the one nonvolatile memory device by selecting or activating a chip enable signal of the one nonvolatile memory device and not selecting or deactivating chip enable signals of the remaining devices (e.g., the remaining nonvolatile memory devices and the second controller 1200b).

Also, in the case where the first controller 1100b communicates with the second controller 1200b connected with the first dedicated channel CH_d1, the first controller 1100b may communicate with the second controller 1200b by not selecting or deactivating all chip enable signals of the plurality of nonvolatile memory devices NVM connected with the first dedicated channel CH_d1 and selecting or activating a chip enable signal of the second controller 1200b.

Figure 17C:
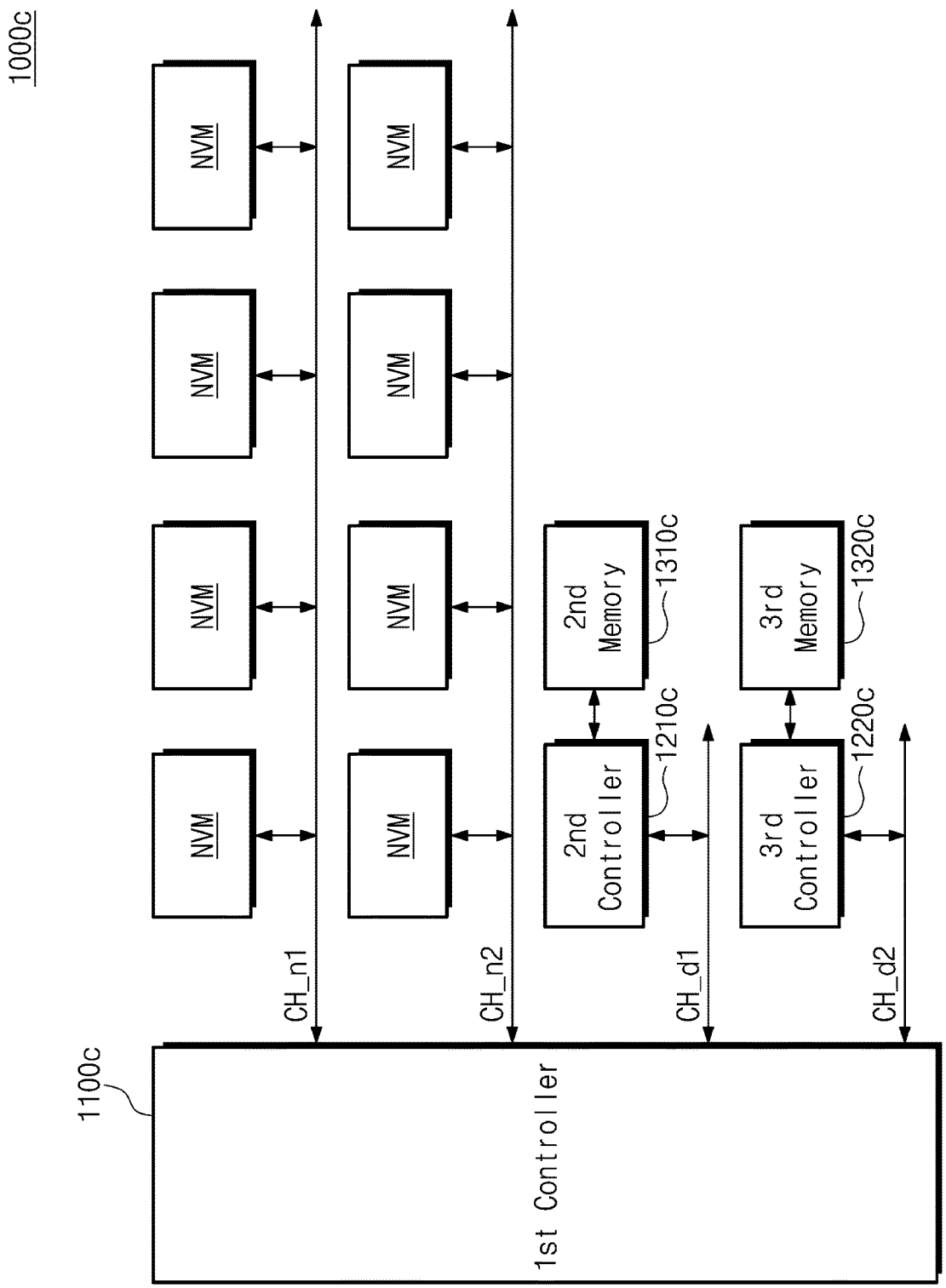

Referring to FIG. 17C, a storage device 1000c may include a first controller 1100c, a plurality of memory devices NVM, a second controller 1210c, a second memory device 1310c, a third controller 1220c, and a third memory device 1320c.

The first controller 1100c may be connected with the plurality of nonvolatile memory devices NVM through first and second normal channels CH_n1 to CH_n2. The first controller 1100c may be connected with the second controller 1210c through the first dedicated channel CH_d1 and may be connected with the third controller 1220c through the second dedicated channel CH_d2. The second controller 1210c may be connected with the second memory device 1310c through a separate interface, and the third controller 1220c may be connected with the third memory device 1320c through a separate interface.

In an example embodiment, the second and third controllers 1210c and 1220c may be configured to perform different special operations. For example, the second controller 1210c may perform a first special operation of performing voice recognition on voice data from an external device (e.g., a host) by using a weight stored in the second memory device 1310c and outputting text information as result data. The third controller 1220c may perform a second special operation of performing image classification on image data from the external device by using a weight stored in the third memory device 1320c and outputting information about the image classification as result data. In response to a request of the external device, the first controller 1100c may communicate with the second controller 1210c or the third controller 1220c to perform a special operation corresponding to the request of the external device.

Figure 17D:
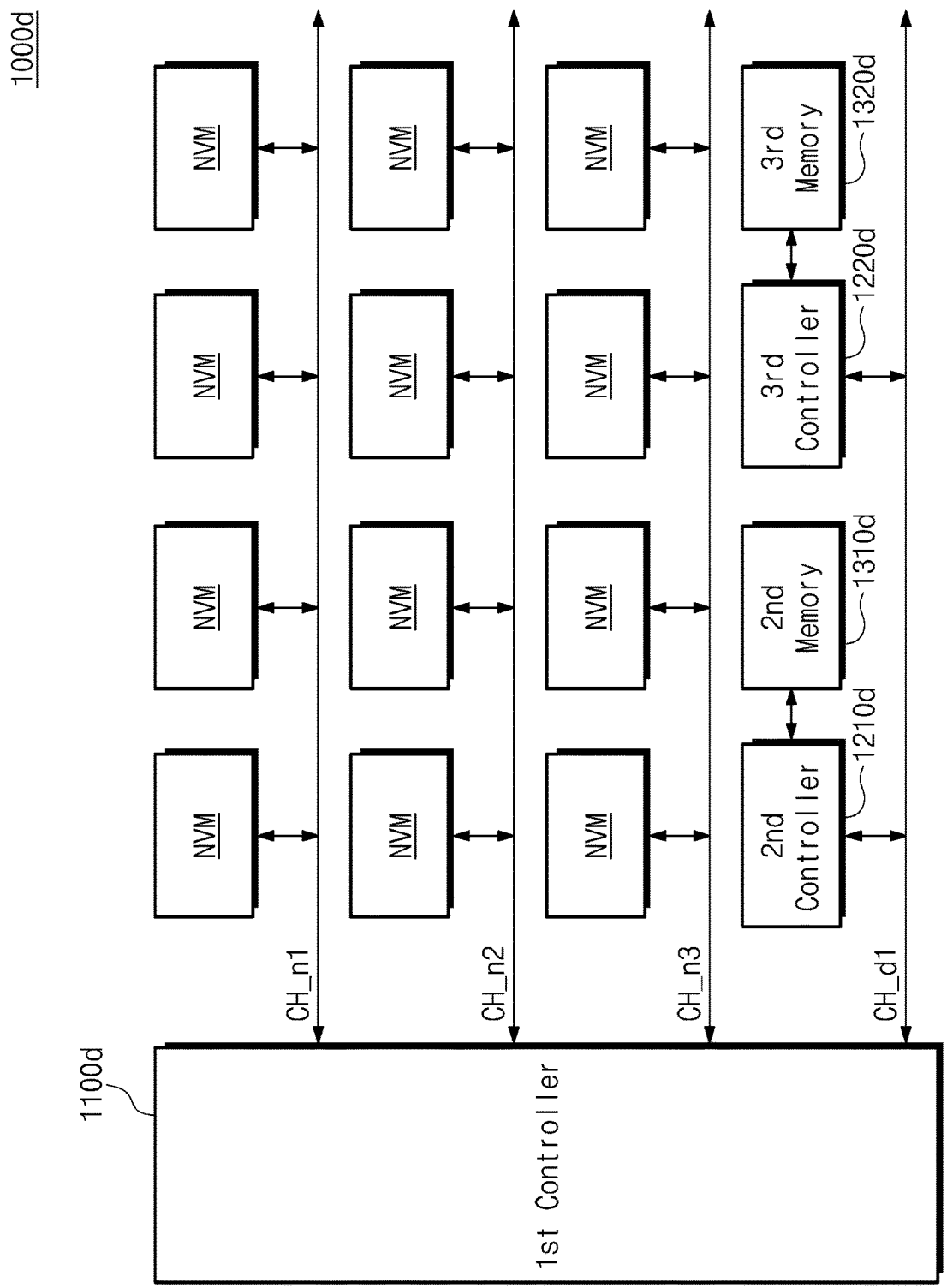

Referring to FIG. 17D, a storage device 1000d may include a first controller 1100d, a plurality of memory devices NVM, a second controller 1210d, a second memory device 1310d, a third controller 1220d, and a third memory device 1320d.

The first controller 1100d may communicate with the plurality of nonvolatile memory devices NVM through the first to third channels CH_n1 to CH_n3. The first controller 1100d may communicate with the second controller 1210d and the third controller 1220d through the first dedicated channel CH_d1. The second controller 1210d may be connected with the second memory device 1310d through a separate interface, and the third controller 1220d may be connected with the third memory device 1320d through a separate interface.

In the embodiment of FIG. 17C, the first controller 1100c communicates with the second and third controllers 1210c and 1220c by using the first and second dedicated channels CH_d1 and CH_d2; however, in the embodiment of FIG. 17D, the first controller 1100d may communicate with the second and third controllers 1210d and 1220d through the first dedicated channel CH_d1 (i.e., one channel). In this case, the first controller 1100d may individually communicate with the second and third controllers 1210d and 1220d by controlling a chip enable signal of each of the second and third controllers 1210d and 1220d.

As described above, a storage device according to an embodiment of the disclosure may include a second controller configured to perform a special operation. A first controller may be configured to communicate with nonvolatile memory devices through a first memory interface normal channel and to communicate with the second controller through a first memory interface dedicated channel.

Figure 18:
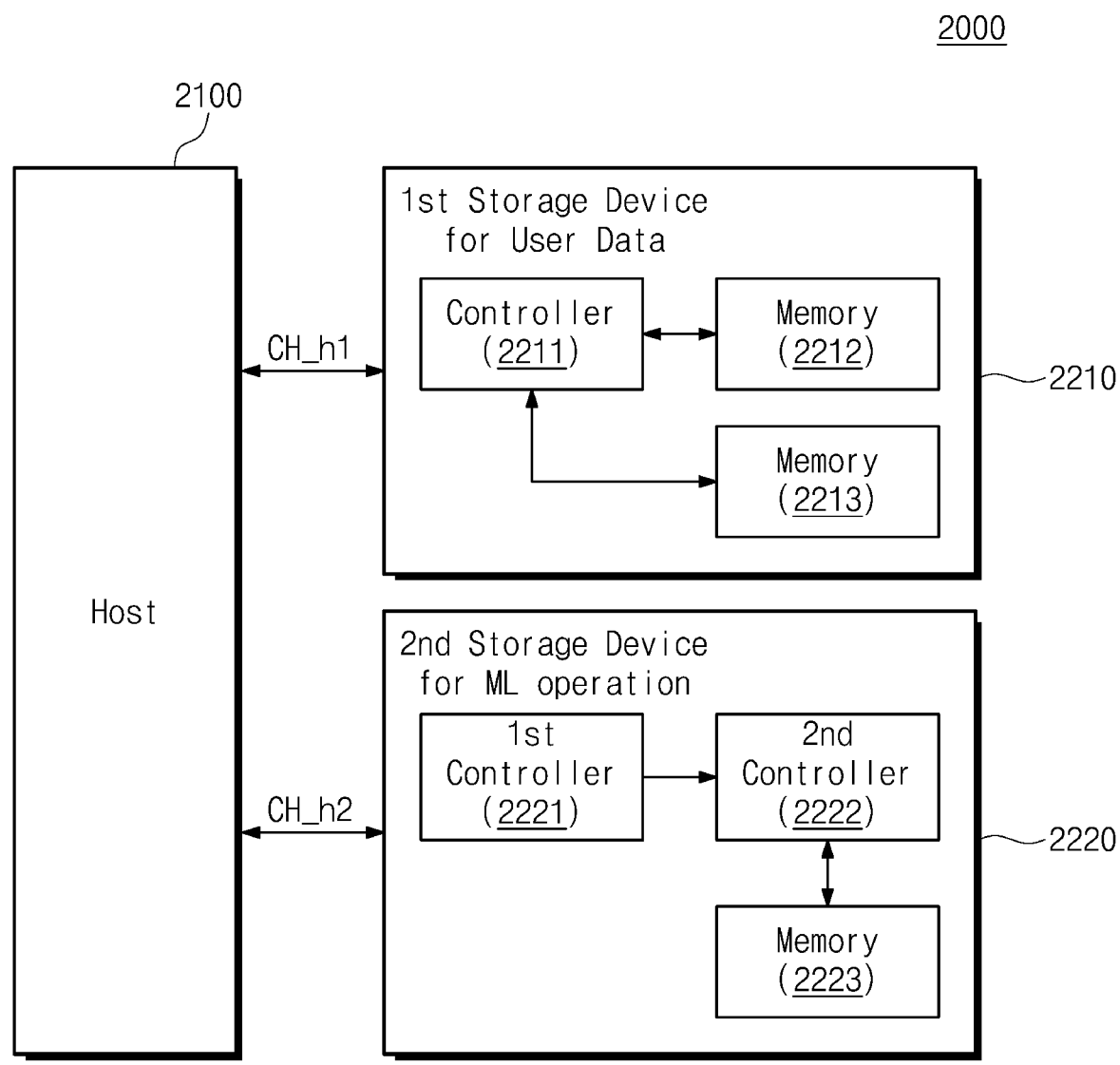
FIG. 18 is a block diagram illustrating a computing system according to an embodiment of the disclosure.

FIG. 18 is a block diagram illustrating a computing system according to an embodiment of the disclosure. Referring to FIG. 18, a computing system 2000 may include a host 2100, a first storage device 2210, and a second storage device 2220. The host 2100 may communicate with the first storage device 2210 through a first host channel CH_h1 and may communicate with the second storage device 2220 through a second host channel CH_h2. In an example embodiment, the first and second host channels CH_h1 and CH_h2 may be a communication channel based on the same interface.

The first storage device 2210 may include a controller 2211 and memory devices 2212 and 2213. The first storage device 2210 may perform a normal storage operation (i.e., an operation of reading, writing, or erasing user data) under control of the host 2100.

The second storage device 2220 may include a first controller 2221, a second controller 2222, and a memory device 2223. The second storage device 2220 may perform the special operation under control of the host 2100. In an example embodiment, the second storage device 2220 may be a storage device including a machine learning function described with reference to FIGS. 1 to 17 or may operate based on an operating method described with reference to FIGS. 1 to 17.

Figure 19:
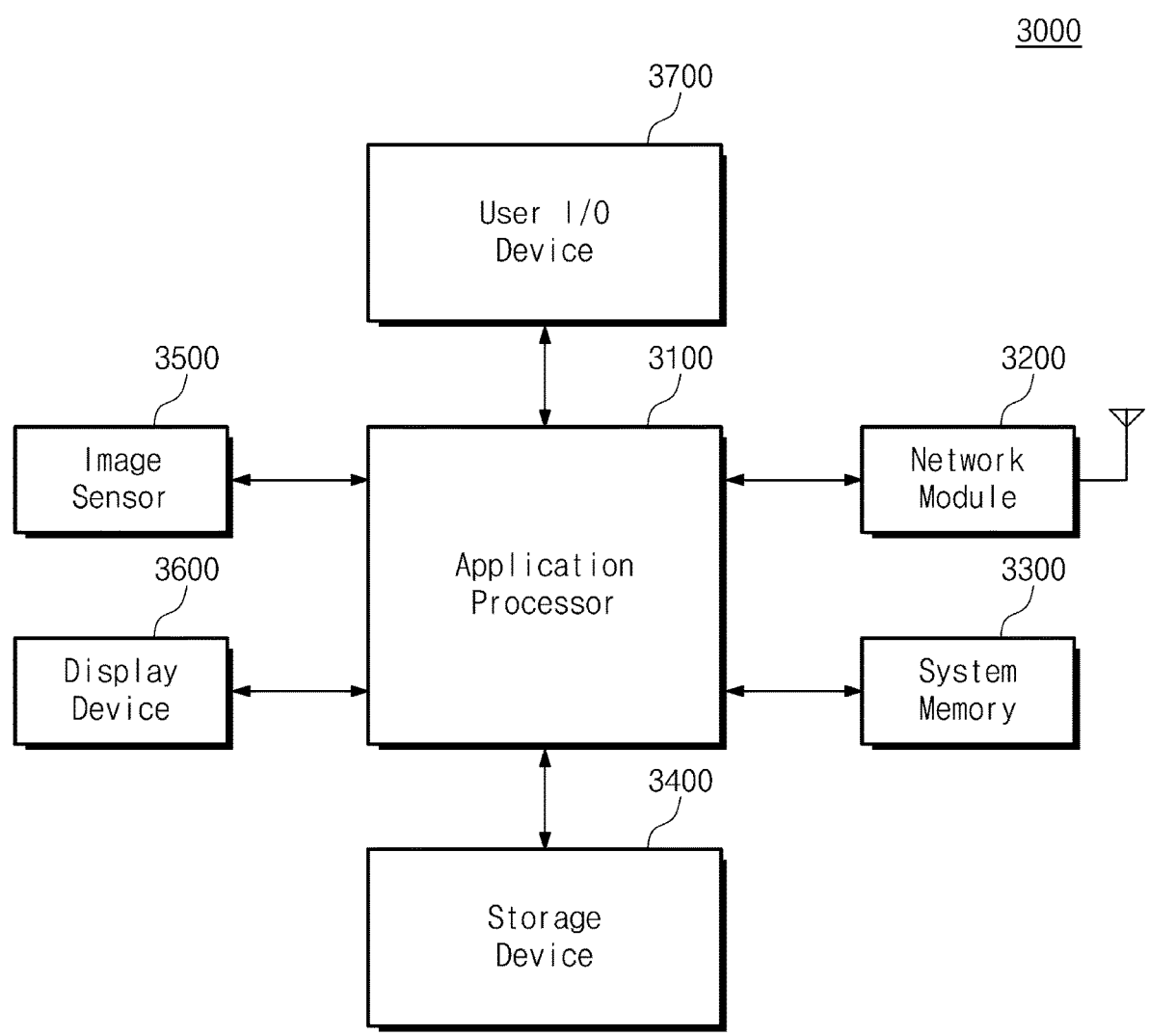
FIG. 19 is a block diagram illustrating a mobile system to which a storage device according to the disclosure is applied.

FIG. 19 is a block diagram illustrating a mobile system to which a storage device according to the disclosure is applied. Referring to FIG. 19, a mobile system 3000 may include an application processor 3100, a network module 3200, a system memory 3300, a storage device 3400, an image sensor 3500, a display device 3600, and a user input/output device 3700. In an example embodiment, the mobile system 3000 may be a portable computing system such as a smartphone, a tablet personal computer (PC), or a notebook.

The application processor 3100 (e.g., an application processor (AP)) may control overall operations of the mobile system 3000. The network module 3200 may provide wireless or wired communication with an external device (e.g., a base station, a server, or any other mobile device). The system memory 3300 may be used as a working memory or a buffer memory of the mobile system 3000. In an example embodiment, the system memory 3300 may be a memory (e.g., a DRAM) supporting a high-speed operation.

The storage device 3400 may be used as a high-capacity storage medium for storing various information used in the mobile system 3000. In an example embodiment, the storage module 3400 may be a storage device including a machine learning function described with reference to FIGS. 1 to 18 and may communicate with the application processor 3100 based on an operating method described with reference to FIGS. 1 to 18.

The display device 3600 may be a device displaying information processed by the application processor 3100 to a user. The image sensor 3500 may be a device collecting image information associated with an external subject. The user input/output device 3700 may be a device which receives a command from a user or provides information, such as a microphone, a speaker, a keypad, or a touch screen display.

According to the disclosure, a storage device may perform a special operation in response to a request of a host. Accordingly, because the burden on various operations of a host or the use of a data center required to perform the special operation decreases, the storage device having an improved performance and reduced costs and an operating method thereof are provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to example embodiments thereof, it will be apparent to those of ordinary skill in the art that various changes and modifications may be made thereto without departing from the spirit and scope of the disclosure as set forth in the following claims.

What is claimed is:

1. A storage device comprising:
a first controller configured to communicate with an external device through a host interface;
a first memory device including a plurality of first memory cells, and configured to directly communicate with the first controller through a first channel of a first memory interface;
a second memory device including a plurality of second memory cells having a same type as the plurality of first memory cells; and
a second controller configured to directly communicate with the first controller through a second channel of the first memory interface, wherein the second controller directly communicates with the second memory device through a second memory interface, wherein
the first controller communicates first data to the second controller with a program command and, in response to the program command received through the first memory interface, the second controller executes a weighting operation on the first data without programming the first data into the second memory device.

2. The storage device of claim 1, wherein each of the plurality of first memory cells and the plurality of second memory cells is a NAND flash memory cell.

3. The storage device of claim 1, wherein:
the first memory device operates in response to a first command latch enable signal, a first address latch enable signal, a first write enable signal, a first read enable signal, and a plurality of first data signals provided through the first memory interface,
the second memory device operates in response to a second command latch enable signal, a second address latch enable signal, a second write enable signal, a second read enable signal, and a plurality of second data signals provided through the second memory interface, and
a number of the plurality of second data signals is more than a number of the plurality of first data signals.

4. The storage device of claim 1, wherein:
the first memory device includes a plurality of first data signal pins connected with the first memory interface,
the second memory device includes a plurality of second data signal pins connected with the second memory interface, and
a number of the second data signal pins is more than a number of the first data signal pins.

5. The storage device of claim 1, wherein:
the plurality of first memory cells of the first memory device are divided into a plurality of first planes, and the plurality of second memory cells of the second memory device are divided into a plurality of second planes, and
a number of the second planes is more than a number of the first planes.

6. The storage device of claim 1, further comprising a third memory device including a plurality of third memory cells having a same type as the plurality of first memory cells and configured to communicate with the second controller through a third memory interface.

* * * * *